US012627941B2

(12) United States Patent
Zhang et al.

(10) Patent No.: US 12,627,941 B2
(45) Date of Patent: May 12, 2026

(54) TRACKING CONTROL METHOD AND APPARATUS, STORAGE MEDIUM, AND COMPUTER PROGRAM PRODUCT

(71) Applicant: HUAWEI TECHNOLOGIES CO., LTD., Shenzhen (CN)

(72) Inventors: Lei Zhang, Dongguan (CN); Zhihui Liu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 18/674,769

(22) Filed: May 24, 2024

(65) Prior Publication Data

US 2024/0314512 A1 Sep. 19, 2024

Related U.S. Application Data

(63) Continuation of application No. PCT/CN2022/105499, filed on Jul. 13, 2022.

(30) Foreign Application Priority Data

Nov. 25, 2021 (CN) ......................... 202111415949.4
Feb. 8, 2022 (CN) ......................... 202210119348.7

(51) Int. Cl.
*H04S 7/00* (2006.01)
*H04R 3/00* (2006.01)

(52) U.S. Cl.
CPC ............. *H04S 7/302* (2013.01); *H04R 3/005* (2013.01)

(58) Field of Classification Search
CPC ........... H04S 7/302; H04R 3/005; H04R 1/40; H04R 1/406; G01S 3/8083; G01S 5/16;
(Continued)

(56) References Cited

U.S. PATENT DOCUMENTS 6,275,258 B1 * 8/2001 Chim .................. H04N 23/661 348/169
6,593,956 B1 * 7/2003 Potts ........................ H04N 7/15 348/E7.083
(Continued)

FOREIGN PATENT DOCUMENTS

CN 1784900 A 6/2006
CN 113203988 A 8/2021
(Continued)

*Primary Examiner* — Xu Mei
(74) *Attorney, Agent, or Firm* — Leydig, Voit & Mayer, Ltd.

(57) ABSTRACT

Embodiments of this application disclose a tracking control method. When a sound source object makes a sound, a control device determines an azimuth $\theta_1$ of the sound source object relative to a first microphone array based on detection data of the first microphone array, and determines an azimuth $\theta_2$ of the sound source object relative to a second microphone array based on detection data of the second microphone array. The control device determines a location of the sound source object based on the azimuth $\theta_1$, the azimuth $\theta_2$, a location of the first microphone array, and a location of the second microphone array. The control device controls, based on the location of the sound source object, a camera to shoot the sound source object to obtain a tracking video image. According to this application, a speaker can be accurately recognized, to improve accuracy of automatic tracking.

20 Claims, 16 Drawing Sheets

(58) Field of Classification Search

CPC .... G01S 5/18; G01S 5/20; G01S 5/22; H04N 23/695; H04N 7/15; H04N 5/268; H04N 5/262

USPC ........................... 381/91, 92, 122; 348/14.08

See application file for complete search history.

(56) References Cited

U.S. PATENT DOCUMENTS

| | | | | |
|---|---|---|---|---|
| 6,912,178 | B2 * | 6/2005 | Chu | H04N 7/142 348/E7.079 |
| 6,980,485 | B2 * | 12/2005 | McCaskill | G01S 3/8083 348/E7.079 |
| 7,586,513 | B2 * | 9/2009 | Muren | H04N 7/15 348/211.4 |
| 8,717,402 | B2 | 5/2014 | Cutler | |
| 8,983,089 | B1 * | 3/2015 | Chu | H04R 1/08 381/92 |
| 9,706,292 | B2 * | 7/2017 | Duraiswami | H04R 1/406 |
| 9,986,360 | B1 | 5/2018 | Aas et al. | |
| 10,750,132 | B2 * | 8/2020 | Huang | H04N 7/188 |
| 10,779,084 | B2 * | 9/2020 | Arteaga | H04R 3/005 |
| 11,803,984 | B2 * | 10/2023 | Fan | G06V 40/161 |
| 12,395,794 | B2 * | 8/2025 | Abraham | H04R 5/04 |
| 2011/0316996 | A1 * | 12/2011 | Abe | H04S 7/303 348/E7.085 |
| 2016/0187453 | A1 * | 6/2016 | Wang | H04R 1/326 367/127 |
| 2020/0077224 | A1 * | 3/2020 | Ohnuma | H04R 29/002 |
| 2024/0007592 | A1 * | 1/2024 | Veselinovic | H04R 3/005 |

FOREIGN PATENT DOCUMENTS

| | | | |
|---|---|---|---|
| JP | 2007214753 | A | 8/2007 |
| WO | 2017215295 | A1 | 12/2017 |
| WO | 2019104629 | A1 | 6/2019 |

* cited by examiner

TRACKING CONTROL METHOD AND APPARATUS, STORAGE MEDIUM, AND COMPUTER PROGRAM PRODUCT

CROSS-REFERENCE TO RELATED APPLICATIONS

This application is a continuation of International Application No. PCT/CN2022/105499, filed on Jul. 13, 2022, which claims priority to Chinese Patent Application No. 202111415949.4, filed on Nov. 25, 2021, and Chinese Patent Application No. 202210119348.7, filed on Feb. 8, 2022. All of the aforementioned patent applications are hereby incorporated by reference in their entireties.

TECHNICAL FIELD

This application relates to the field of communication technologies, and in particular, to a tracking control method and apparatus, a storage medium, and a computer program product.

BACKGROUND

Tracking means that a camera is controlled based on a real-time shooting requirement to shoot a key object (a person or an object) in a scene, to output a video image in a video shooting process. For example, in a video conference, the camera may be controlled to shoot a current speaker, and when the speaker changes, the camera may be controlled to shoot a new speaker. In a tracking process, to obtain a video image that includes a key object, a shooting direction of the camera may be adjusted, or a video image may be selected from video images of a plurality of cameras, or a part of the video image may be captured.

At present, with the development of computer technology, automatic tracking has developed rapidly and is gradually replacing manual tracking. Generally, a processing process of automatic tracking is as follows: A control device recognizes a video image that is shot by the camera in real time, determines an object (that is, the foregoing key object) having a specified feature in the image, and controls the camera to shoot the object. For example, in a conference scenario, the control device may recognize a person standing or having a mouth movement (speaking) in a video image shot in real time, determine the person as a speaker, and then control the camera to shoot a close-up of the speaker for playing.

However, an automatic tracking method in the conventional technology has obvious limitations, and sometimes tracking accuracy is poor.

SUMMARY

Embodiments of this application provide a tracking control method, to resolve a problem of poor tracking accuracy in the conventional technology. The technical solutions are as follows.

According to a first aspect, a tracking control method is provided. The method is applied to a tracking control system, and the tracking control system includes a first microphone array, a second microphone array, a camera, and a control device. The method includes: The control device determines a location of the first microphone array and a location of the camera; when a sound source object makes a sound, the control device determines a location of the sound source object based on a location of the sound source object relative to the first microphone array, a location of the sound source object relative to the second microphone array, the location of the first microphone array, and a location of the second microphone array; and the control device determines a tracking operation on the camera based on the location of the sound source object and the location of the camera.

When a speaker speaks, each microphone in the first microphone array may detect corresponding audio data, and the first microphone array sends the audio data to the control device. The control device may perform sound source localization based on the audio data, and determine an azimuth $\theta_1$ of the speaker relative to the first microphone array. An algorithm used in a sound source localization process may be a steered-response power (SRP) algorithm or the like. Similarly, the control device may also perform sound source localization based on audio data detected by a microphone in the second microphone array, and determine an azimuth $\theta_2$ of the speaker relative to the second microphone array.

When deviation angles of the first microphone array and the second microphone array are both 0 degrees, the control device may obtain a location of the speaker through calculation based on the azimuth $\theta_1$, the azimuth $\theta_2$, the location of the first microphone array, the location of the second microphone array, and a geometric relationship between the first microphone array, the second microphone array, and the speaker.

When neither of the deviation angles of the first microphone array and the second microphone array is 0 degrees, the control device may obtain the location of the speaker through calculation based on the deviation angle $\gamma_1$ of the first microphone array, the deviation angle $\gamma_2$ of the second microphone array, the azimuth $\theta_1$, the azimuth $\theta_2$, the location of the first microphone array, the location of the second microphone array, and the geometric relationship between the first microphone array, the second microphone array, and the speaker.

After determining the location of the speaker, the control device may calculate an azimuth of the speaker relative to the camera and a distance between the speaker and the camera based on the location of the speaker and the location of the camera. The distance is a plane equivalent distance, that is, a projection distance between an equivalent center of the camera and an equivalent center of the speaker in a plane.

A tracking rotation angle of the camera may be determined based on the azimuth of the speaker relative to the camera. The camera may include a rotatable camera head and a fixed base. The camera head may rotate relative to the fixed base, and an initial shooting direction may be specified for the camera head. The initial shooting direction may be the same as a reference direction of the camera head. The tracking rotation angle may be an angle of a real-time shooting direction of the camera head relative to the initial shooting direction. The initial shooting direction may be considered as a 0-degree direction. The tracking rotation angle and the azimuth of the speaker relative to the camera may be the same.

After the distance between the speaker and the camera is determined, a tracking focal length of the camera may be determined based on the distance. The control device may search a prestored first correspondence table, to determine the tracking focal length corresponding to the distance. The first correspondence table may record a correspondence between a distance of the speaker relative to the camera and a focal length of the camera.

When a deviation angle of the camera is 0 degrees, the control device may determine the tracking rotation angle and the tracking focal length of the camera based on the location of the speaker and the location of the camera, to control the camera to rotate to the tracking rotation angle and control the camera to perform shooting based on the tracking focal length.

When a deviation angle of the camera is not 0 degrees, the control device may determine the tracking rotation angle and the tracking focal length of the camera based on the deviation angle of the camera, the location of the speaker, and the location of the camera, to control a pan-tilt-zoom of the camera to rotate to the tracking rotation angle and control the camera to perform shooting based on the tracking focal length.

It should be noted that in the foregoing example of the tracking control system, a plurality of camera heads may be added and arranged in different locations, to better shoot a participant.

When there are at least two camera heads in the tracking control system, the control device may determine, based on the location of the speaker and locations of two cameras, a target camera that is in the two cameras and that is farther away from the speaker, and determine a tracking operation on the target camera based on the location of the speaker and a location of the target camera.

The control device may control, based on the location of the sound source object and locations of the plurality of cameras, the plurality of cameras to shoot the sound source object, to obtain a plurality of video images. Then, image recognition may be performed on the plurality of obtained video images, and a video image that meets a target condition is selected as a tracking video image. There may be a plurality of target conditions. For example, a video image in which a face angle is closest to the front is selected as a tracking video image. A face angle in the video image may be determined by using a machine learning model for face angle detection.

In the solution in embodiments of this application, provided that the sound source object makes a sound, the sound source object can be located based on the sound. In this way, a speaker does not need to have an obvious movement (for example, an obvious mouth movement) when the sound source object is located based on image recognition. In this way, a limitation of an automatic tracking method based on image recognition in the conventional technology is eliminated, and tracking accuracy is improved.

In a possible implementation, the first microphone array is integrated with a first sound emitter, and the second microphone array includes a first microphone and a second microphone. The control device determines a distance $D_1$ between the first sound emitter and the first microphone and a distance $D_2$ between the first sound emitter and the second microphone based on time at which the first microphone and the second microphone receive a sound signal from the first sound emitter and time at which the first sound emitter emits the sound signal. The control device determines a location of the first microphone array relative to the second microphone array based on a location of the first microphone, a location of the second microphone, the distance $D_1$, and the distance $D_2$.

Equivalent centers of the first sound emitter and the first microphone array may be the same. That is, a location of the first sound emitter and the location of the first microphone array may be the same. The location of the first microphone array relative to the second microphone array may be a location of the first sound emitter in the first microphone array relative to the second microphone array. In specific implementation, the location may be determined by using a coordinate system. For example, when an origin of the coordinate system is set at the center of the second microphone array, coordinates of the first microphone array reflect the location of the first microphone array relative to the second microphone array.

There may be a plurality of manners for obtaining the time at which the first sound emitter emits the sound signal. For time at which a sound emitter emits a sound signal in subsequent processing, refer to the description herein.

Manner 1: It may be set that the first sound emitter emits a sound signal each time the first sound emitter is powered on, and the control device may obtain power-on time of the first sound emitter as the time at which the first sound emitter emits the sound signal.

Manner 2: The control device indicates the first sound emitter to emit a sound signal. When the first sound emitter emits a sound signal, time at which the sound signal is emitted may be recorded, and then the time is sent to the control device.

When the control device controls the first sound emitter to emit a sound signal $S_1$, the first sound emitter sends, to the control device for recording, a time point $t_1$ at which the sound signal $S_1$ is emitted. Each microphone in the second microphone array may receive a sound signal, record a time point at which the sound signal is detected, and send the time point to the control device. The control device may obtain a time point $t_2$ at which the first microphone in the second microphone array detects the sound signal $S_1$ and a time point $t_3$ at which the second microphone in the second microphone array detects the sound signal $S_1$, and then may obtain, through calculation, duration $\Delta T_1$ between the time point $t_1$ and the time point $t_2$ and duration $\Delta T_2$ between the time point $t_1$ and the time point $t_3$. Further, the control device may obtain, through calculation, the distance $D_1$ between the first microphone and the first sound emitter and the distance $D_2$ between the second microphone and the first sound emitter based on prestored sound speed data V.

Based on the locations of the first microphone and the second microphone, it may be determined that a distance between the first microphone and the second microphone is D. Then, the control device may obtain the location of the first sound emitter through calculation based on the distance D, the distance $D_1$, and the distance $D_2$, and a geometric relationship between the first microphone, the second microphone, and the first sound emitter.

In the solution in this embodiment of this application, the distance $D_1$ between the first microphone and the first sound emitter and the distance $D_2$ between the first sound emitter and the second microphone are determined based on time at which the first microphone and the second microphone receive a sound signal from the first sound emitter and time at which the first sound emitter emits the sound signal, and then the location of the first microphone array relative to the second microphone array is determined based on the location of the first microphone, the location of the second microphone, the distance $D_1$, and the distance $D_2$. In this way, a device parameter does not need to be manually calibrated, to improve convenience of calibrating the device parameter.

In a possible implementation, the tracking control system further includes a second sound emitter and a third sound emitter, and the second sound emitter and the third sound emitter are integrated on a same electronic screen as the second microphone array. The control device obtains an azimuth $\theta_3$ of the second sound emitter relative to the first microphone array and an azimuth $\theta_4$ of the third sound emitter relative to the first microphone array that are sent by the first microphone array. The control device determines an orientation of the first microphone array based on the azimuth $\theta_3$, the azimuth $\theta_4$, a location of the second sound emitter, and a location of the third sound emitter.

The location of the second sound emitter and the location of the third sound emitter may be preset, and the control device may prestore the location of the second sound emitter and the location of the third sound emitter, and do not need to obtain the locations from the microphone array. An orientation of a device is a direction of a reference direction of the device, and may be represented by an included angle between the reference direction of the device and a specified direction (that is, a deviation angle of the device). The specified direction may be an X-axis direction or a Y-axis direction.

When the second sound emitter emits a sound signal $S_2$, each microphone in the first microphone array may detect corresponding audio data, and the first microphone array sends the audio data to the control device. The control device may perform sound source localization based on the audio data, and determine the azimuth $\theta_3$ of the second sound emitter relative to the first microphone array. Similarly, when the third sound emitter makes a sound, the control device may also perform sound source localization based on audio data detected by a microphone in the first microphone array, and determine the azimuth $\theta_4$ of the third sound emitter relative to the first microphone array. The following describes an azimuth calculation principle, that is, the SRP algorithm. A calculation formula of this algorithm is as follows:

$$Y(\theta) = \sum_{K} \sum_{m=1}^{M} \frac{X_m(k)}{|X_m(k)|} s(\theta)$$

$X_m(k)$ represents a fast Fourier transform (FFT) value of a frequency band k of the $m^{th}$ microphone, and $s(\theta)$ represents a steering vector corresponding to a sound source located at an angle $\theta$ in a two-dimensional space plane. The steering vector may be calculated in advance based on a layout of microphones in a microphone array and an angle search range (which is set manually, and is an angle range for determining a maximum extreme point subsequently). A linear layout of microphones in the microphone array is used as an example, and a calculation formula of the steering vector is:

$$s(\theta) = \begin{bmatrix} 1 \\ e^{j\frac{2\pi c}{f} d_1 \cos\theta} \\ e^{j\frac{2\pi c}{f} d_2 \cos\theta} \\ e^{j\frac{2\pi c}{f} d_3 \cos\theta} \\ \vdots \\ e^{j\frac{2\pi c}{f} d_m \cos\theta} \end{bmatrix}$$

The first microphone is selected as a reference microphone. $d_m \cos\theta$ represents a difference between distances from the sound source to the $m^{th}$ microphone and the reference microphone. For single sound source localization, when $\theta$ belongs to the angle search range, an angle $\theta$ corresponding to a maximum extreme point of $Y(\theta)$ is determined, that is, an azimuth of the sound source object.

The control device may determine a distance L between the second sound emitter and the third sound emitter based on location coordinates of the second sound emitter and location coordinates of the third sound emitter. Then, the control device may determine a deviation angle $\theta_5$ of the first microphone array through calculation based on the azimuth $\theta_3$, the azimuth $\theta_4$, the location of the second sound emitter, the location of the third sound emitter, and a location relationship between the first microphone array, the second sound emitter, and the third sound emitter.

In the solution in this embodiment of this application, the azimuth $\theta_3$ of the second sound emitter relative to the first microphone array and the azimuth $\theta_4$ of the third sound emitter relative to the first microphone array that are sent by the first microphone array are first obtained, and then the orientation of the first microphone array is determined based on the azimuth $\theta_3$, the azimuth $\theta_4$, the location of the second sound emitter, and the location of the third sound emitter. In this way, a device parameter does not need to be manually calibrated, to improve convenience of calibrating the device parameter.

In a possible implementation, the camera is integrated with a fourth sound emitter, and the second microphone array includes a first microphone and a second microphone. The control device determines a distance $D_3$ between the first microphone and the fourth sound emitter and a distance $D_4$ between the second microphone and the fourth sound emitter based on time at which the first microphone and the second microphone receive a sound signal from the fourth sound emitter and time at which the fourth sound emitter emits the sound signal. The control device determines a location of the camera relative to the second microphone array based on a location of the first microphone, a location of the second microphone, the distance $D_3$, and the distance $D_4$.

Equivalent centers of the fourth sound emitter and the camera may be the same. That is, a location of the fourth sound emitter may be the same as the location of the camera.

When controlling the fourth sound emitter to emit a sound signal $S_4$, the control device may record a time point $t_4$ at which the fourth sound emitter emits the sound signal $S_4$. Each microphone in the second microphone array may detect corresponding audio data, and record a detection time point corresponding to the audio data, that is, a time point at which the audio data is detected. The control device may obtain a time point $t_5$ at which the first microphone in the second microphone array detects the sound signal $S_4$ and a time point $t_6$ at which the second microphone in the second microphone array detects the sound signal $S_4$, and then may obtain, through calculation, duration $\Delta T_3$ between the time point $t_4$ and the time point $t_5$ and duration $\Delta T_4$ between the time point $t_4$ and the time point $t_6$. Further, the control device may obtain, through calculation, the distance $D_3$ between the first microphone and the fourth sound emitter and the distance $D_4$ between the second microphone and the fourth sound emitter based on prestored sound speed data V.

Based on the locations of the first microphone and the second microphone, it may be determined that a distance between the first microphone and the second microphone is D. Then, the control device may obtain the location of the fourth sound emitter through calculation based on the distance D, the distance $D_3$, and the distance $D_4$, and a geometric relationship between the first microphone, the second microphone, and the fourth sound emitter.

In the solution in this embodiment of this application, the distance $D_3$ between the first microphone and the fourth sound emitter and the distance $D_4$ between the second microphone and the fourth sound emitter are first determined based on time at which the first microphone and the second microphone receive a sound signal from the fourth sound emitter and time at which the fourth sound emitter emits the sound signal, and then the location of the camera relative to the second microphone array is determined based on the location of the first microphone, the location of the second microphone, the distance $D_3$, and the distance $D_4$. In this way, a device parameter does not need to be manually calibrated, to improve convenience of calibrating the device parameter.

In a possible implementation, the first microphone array is integrated with a first sound emitter, and the camera is integrated with a fourth sound emitter and a third microphone array. The control device determines an azimuth $\theta_6$ of the first sound emitter relative to the third microphone array based on data detected by the third microphone array when the first sound emitter emits a sound signal, and determines an azimuth $\theta_7$ of the fourth sound emitter relative to the first microphone array based on data detected by the first microphone array when the fourth sound emitter emits a sound signal. The control device determines a deviation angle of the camera based on the azimuth $\theta_6$, the azimuth $\theta_7$, and the orientation of the first microphone array.

The orientation of the first microphone array may be manually measured and stored in the control device, or may be measured by using a parameter calibration process. An equivalent center of the third microphone array may be the same as an equivalent center of the camera. That is, a location of the third microphone array may be the same as the location of the camera. A deviation angle of the third microphone array may be the same as the deviation angle of the camera. An equivalent center of the fourth sound emitter may be the same as the equivalent center of the camera. That is, a location of the fourth sound emitter may be the same as the location of the camera.

When the first sound emitter emits a sound signal $S_5$, each microphone in the third microphone array may detect corresponding audio data, and the third microphone array sends the audio data to the control device. The control device may perform sound source localization based on the audio data, and determine the azimuth $\theta_6$ of the first sound emitter relative to the third microphone array. Similarly, when the fourth sound emitter makes a sound, the control device may also perform sound source localization based on audio data detected by a microphone in the first microphone array, and determine the azimuth $\theta_7$ of the fourth sound emitter relative to the first microphone array. A deviation angle $\theta_8$ of the third microphone and the camera may be obtained through calculation based on the azimuth $\theta_6$, the azimuth $\theta_7$, the deviation angle $\theta_5$, and a geometric relationship between the first sound emitter, the third microphone array, and the fourth sound emitter.

In the solution in this embodiment of this application, the azimuth $\theta_6$ of the first sound emitter relative to the third microphone array is first determined based on the data detected by the third microphone array when the first sound emitter emits a sound signal, the azimuth $\theta_7$ of the fourth sound emitter relative to the first microphone array is determined based on the data detected by the first microphone array when the fourth sound emitter emits a sound signal, and then the deviation angle of the camera is determined based on the azimuth $\theta_6$, the azimuth $\theta_7$, and the orientation of the first microphone array. In this way, a device parameter does not need to be manually calibrated, to improve convenience of calibrating the device parameter.

In a possible implementation, the first microphone array is integrated with a light emitter, and the camera is integrated with a fourth sound emitter. The control device determines a location of a light emitting point in an image shot by the camera, where the image is shot when the light emitter emits light, and determines an azimuth $\theta_9$ of the light emitter relative to the camera based on the location of the light emitting point in the image and a rotation angle of the camera. The control device determines an azimuth $\theta_7$ of the fourth sound emitter relative to the first microphone array based on data detected by the first microphone array when the fourth sound emitter emits a sound signal. The control device determines an orientation of the camera based on the azimuth $\theta_9$, the azimuth $\theta_7$, and the orientation of the first microphone array.

The orientation of the first microphone array is an angle of a reference direction of the first microphone array relative to a first specified direction, and the first specified direction may be an X-axis positive direction or another specified direction. The orientation of the camera is an angle of a reference direction of the camera relative to a second specified direction, and the second specified direction may be a Y-axis positive direction. An equivalent center of the light emitter may be the same as an equivalent center of the first microphone array. That is, a location of the light emitter may be the same as the location of the first microphone array. An equivalent center of the fourth sound emitter may be the same as the equivalent center of the camera. That is, a location of the fourth sound emitter may be the same as the location of the camera.

The control device may record a correspondence between a focal length of the camera and a horizontal shooting angle range (or referred to as a horizontal angle of view). The correspondence may be reported by the camera to the control device, or may be manually recorded into the control device, or the like. The control device may determine a current focal length of the camera. Then, a horizontal shooting angle range $\gamma_4$ corresponding to the current focal length is searched in the foregoing correspondence table. After controlling the light emitter to emit light, the controller may obtain an image shot by the camera, and determine, in the image, a distance $L_3$ between a location of the light emitting point and a longitudinal central axis of the image. The control device may record a distance $L_4$ between a left or right boundary of the image and the longitudinal central axis of the image. A real-time shooting direction of the camera head corresponds to the longitudinal central axis of the image. An azimuth $\gamma_5$ of the light emitter relative to the camera head may be determined based on the horizontal shooting angle $\gamma_4$, the distance $L_3$, and the distance $L_4$. The azimuth $\gamma_5$ is an anticlockwise included angle from the real-time shooting direction of the camera head to a line connecting the light emitter and the camera head. In this case, the control device may further obtain a current rotation angle $\gamma_6$ of the camera. The azimuth $\theta_9$ of the light emitter relative to the camera may be obtained through calculation based on the azimuth $\gamma_5$ and the rotation angle $\gamma_6$. The rotation angle $\gamma_6$ is a rotation angle of the camera head of the camera relative to the fixed base. Generally, the camera head rotates under control of the control device. Therefore, the control device learns of the rotation angle $\gamma_6$. It should be noted that the rotation angle is not a necessary parameter for calculating the orientation of the camera. In other possible cases, the orientation of the camera may be calculated without using the rotation angle.

The control device may control the fourth sound emitter to emit a sound signal $S_6$. When the fourth sound emitter emits the sound signal $S_6$, each microphone in the first microphone array may detect corresponding audio data, and the first microphone array may send the audio data to the control device. The control device may perform sound source localization based on the audio data, and determine the azimuth $\theta_7$ of the fourth sound emitter relative to the first microphone array.

The control device may obtain a deviation angle $\theta_8$ of the camera through calculation based on the azimuth $\theta_9$, the azimuth $\theta_7$, a deviation angle $\theta_5$ of the first microphone array, and a geometric relationship between the first microphone array, the camera, and the fourth sound emitter.

In the solution in this embodiment of this application, the location of the light emitting point in the image shot by the camera is first determined, the azimuth $\theta_9$ of the light emitter relative to the camera is determined based on the location of the light emitting point in the image and the rotation angle of the camera, and then the azimuth $\theta_7$ of the fourth sound emitter relative to the first microphone array is determined based on the data detected by the first microphone array when the fourth sound emitter emits a sound signal, and further, the location of the camera is determined based on the azimuth $\theta_9$, the azimuth $\theta_7$, and the orientation of the first microphone array. In this way, a device parameter does not need to be manually calibrated, to improve convenience of calibrating the device parameter.

In a possible implementation, the first microphone array is integrated with a first sound emitter, the second microphone array includes a first microphone and a second microphone. The control device determines a distance $D_5$ between the first sound emitter and the second microphone array and an azimuth $\theta_{10}$ of the first sound emitter relative to the second microphone array based on data detected by the second microphone array when the first sound emitter emits a sound signal. The control device determines the location of the first microphone array based on the distance $D_5$, the azimuth $\theta_{10}$, and the location of the second microphone array.

Equivalent centers of the first sound emitter and the first microphone array may be the same. That is, a location of the first sound emitter and the location of the first microphone array may be the same.

When controlling the first sound emitter to emit a sound signal $S_7$, the control device may record a time point $t_7$ at which the first sound emitter emits the sound signal $S_7$. A microphone in the second microphone array may detect corresponding audio data, and record a detection time point $t_8$ corresponding to the audio data, that is, a time point at which the audio data is detected. The control device may obtain the time point $t_7$ at which the second microphone array detects the sound signal $S_7$ and the time point $t_8$ at which the second microphone array detects the sound signal $S_7$, and then may obtain, through calculation, duration $\Delta T_5$ between the time point $t_7$ and the time point $t_8$. Further, the control device may obtain, through calculation, the distance $D_5$ between the second microphone array and the first sound emitter based on prestored sound speed data V.

In addition, the second microphone array may send the audio data corresponding to the sound signal $S_7$ to the control device. The control device may perform sound source localization based on the audio data, and determine the azimuth $\theta_{10}$ of the first sound emitter relative to the second microphone array.

The control device may obtain the location of the first sound emitter through calculation based on the distance $D_5$, the azimuth $\theta_{10}$, the location of the second microphone array, and a geometric relationship between the first sound emitter and the second microphone array.

In the solution in this embodiment of this application, the distance $D_5$ between the first sound emitter and the second microphone array and the azimuth $\theta_{10}$ of the first sound emitter relative to the second microphone array are first determined based on the data detected by the second microphone array when the first sound emitter emits a sound signal, and then the location of the first microphone array is determined based on the distance $D_5$, the azimuth $\theta_{10}$, and the location of the second microphone array. In this way, a device parameter does not need to be manually calibrated, to improve convenience of calibrating the device parameter.

In a possible implementation, the first microphone array is integrated with a first sound emitter, and the second microphone array is integrated with a fifth sound emitter. The control device determines an azimuth $\theta_{10}$ of the first sound emitter relative to the second microphone array based on data detected by the second microphone array when the first sound emitter emits a sound signal, and determines an azimuth $\theta_{11}$ of the fifth sound emitter relative to the first microphone array based on data detected by the first microphone array when the fifth sound emitter emits a sound signal. The control device determines an orientation of the first microphone array based on the azimuth $\theta_{10}$, the azimuth $\theta_{11}$, and an orientation of the second microphone array.

When the first sound emitter emits a sound signal $S_7$, a microphone in the second microphone array may detect corresponding audio data, and the second microphone array may send the audio data to the control device. The control device may perform sound source localization based on the audio data, and determine the azimuth $\theta_{10}$ of the first sound emitter relative to the second microphone array. Similarly, when the fifth sound emitter makes a sound, the control device may also perform sound source localization based on audio data detected by a microphone in the first microphone array, and determine the azimuth $\theta_{11}$ of the fifth sound emitter relative to the first microphone array.

When $\theta_{12}$ is 0 degrees, the control device may determine a deviation angle $\theta_5$ of the first microphone array based on the azimuth $\theta_{10}$, the azimuth $\theta_{11}$, and a geometric relationship between the second microphone array and the first microphone array. When $\theta_{12}$ is not 0 degrees, the control device may determine the deviation angle $\theta_5$ of the first microphone array based on the azimuth $\theta_{10}$, the azimuth $\theta_{11}$, the included angle $\theta_{12}$, and the geometric relationship between the second microphone array and the first microphone array.

It should be noted that there are a plurality of possible location relationships between the first microphone array and the second microphone array. The foregoing description process is described by using only one of the location relationships as an example. For another possible location relationship, the deviation angle of the first microphone array may be obtained through a geometric operation based on the foregoing related data.

In the solution in this embodiment of this application, the azimuth $\theta_{10}$ of the first sound emitter relative to the second microphone array is first determined based on the data detected by the second microphone array when the first sound emitter emits a sound signal, and the azimuth $\theta_{11}$ of the fifth sound emitter relative to the first microphone array is determined based on the data detected by the first microphone array when the fifth sound emitter emits a sound signal. Then, the device determines the orientation of the first microphone array based on the azimuth $\theta_{10}$, the azimuth $\theta_{11}$, and the orientation of the second microphone array. In this way, a device parameter does not need to be manually calibrated, to improve convenience of calibrating the device parameter.

In a possible implementation, the camera is integrated with a fourth sound emitter. The control device determines a distance $D_6$ between the first microphone array and the fourth sound emitter and a distance $D_7$ between the second microphone array and the fourth sound emitter based on time at which the first microphone array and the second microphone array receive a sound signal from the fourth sound emitter and time at which the fourth sound emitter emits the sound signal. The control device determines the location of the camera based on the location of the first microphone array, the location of the second microphone array, the distance $D_6$, and the distance $D_7$.

Equivalent centers of the fourth sound emitter and the camera may be the same. That is, a location of the fourth sound emitter may be the same as the location of the camera.

When controlling the fourth sound emitter to emit a sound signal $S_9$, the control device may record a time point to at which the fourth sound emitter emits the sound signal $S_9$. The first microphone array and the second microphone array may detect corresponding audio data, and record a detection time point corresponding to the audio data, that is, a time point at which the audio data is detected. The control device may obtain a time point $t_{10}$ at which the first microphone array detects the sound signal $S_9$ and a time point $t_{11}$ at which the second microphone array detects the sound signal $S_9$, and then may obtain, through calculation, duration $\Delta T_6$ between the time point to and the time point $t_{10}$ and duration $\Delta T_7$ between the time point $t_9$ and the time point $t_{11}$. Further, the control device may obtain, through calculation, the distance $D_6$ between the first microphone array and the fourth sound emitter and the distance $D_7$ between the second microphone array and the fourth sound emitter based on prestored sound speed data V.

Based on the locations of the first microphone array and the second microphone array, it may be determined that a distance between the first microphone array and the second microphone array is $D_8$. Then, the control device may obtain the location of the fourth sound emitter through calculation based on the distance $D_6$, the distance $D_7$, and the distance $D_8$, and a geometric relationship between the first microphone array, the second microphone array, and the fourth sound emitter.

In the solution in this embodiment of this application, the distance $D_6$ between the first microphone array and the fourth sound emitter and the distance $D_7$ between the second microphone array and the fourth sound emitter are first determined based on time at which the first microphone array and the second microphone array receive a sound signal from the fourth sound emitter and time at which the fourth sound emitter emits the sound signal, and then the location of the camera is determined based on the location of the first microphone array, the location of the second microphone array, the distance $D_6$, and the distance $D_7$. In this way, a device parameter does not need to be manually calibrated, to improve convenience of calibrating the device parameter.

In a possible implementation, the control device determines an azimuth of the sound source object relative to the camera and a distance between the sound source object and the camera based on the location of the sound source object and the location of the camera. The control device determines a tracking rotation angle of the camera based on the azimuth of the sound source object relative to the camera, and determines a tracking focal length of the camera based on the distance between the sound source object and the camera.

An azimuth of a speaker relative to the camera and a distance between the speaker and the camera may be calculated based on a location of the speaker and the location of the camera. The distance is a plane equivalent distance, that is, a projection distance between an equivalent center of the camera and an equivalent center of the speaker in a plane.

Then, the tracking rotation angle of the camera may be determined based on the azimuth of the speaker relative to the camera. The camera may include a rotatable camera head and a fixed base. The camera head may rotate relative to the fixed base, and an initial shooting direction may be specified for the camera head. The initial shooting direction may be the same as a reference direction of the camera head. The tracking rotation angle may be an angle of a real-time shooting direction of the camera head relative to the initial shooting direction. The initial shooting direction may be considered as a 0-degree direction. The tracking rotation angle and the azimuth of the speaker relative to the camera may be the same.

After the distance between the speaker and the camera is determined, the tracking focal length of the camera may be determined based on the distance. The control device may search a prestored first correspondence table, to determine the tracking focal length corresponding to the distance. The first correspondence table may record a correspondence between a distance of the speaker relative to the camera and a focal length of the camera.

In the solution in this embodiment of this application, based on the location of the sound source object and the location of the camera, the control device first determines the azimuth of the sound source object relative to the camera and the distance between the sound source object and the camera based on the location of the sound source object and the location of the camera, then determines the tracking rotation angle of the camera based on the azimuth of the sound source object relative to the camera, and determines the tracking focal length of the camera based on the distance between the sound source object and the camera. In this way, a tracking parameter does not need to be manually determined, to improve convenience of a tracking process.

In a possible implementation, time at which the first sound emitter emits a sound signal is time at which the first sound emitter is powered on.

In a possible implementation, the tracking control system further includes another camera. The control device determines, based on the location of the sound source object and locations of the two cameras, a target camera that is in the two cameras and that is farther away from the sound source object, and determines a tracking operation on the target camera based on the location of the sound source object and the location of the target camera.

This processing manner is applicable to the following scenario: A long table is arranged in a conference room, several chairs are arranged on both sides of the long table, and a speaker sits on the chair facing the long table. Cameras are disposed on walls on both sides of the long table. In this scenario, for the two cameras that are disposed on the walls on both sides of the long table, the camera farther away from the speaker can better capture the face of the speaker.

In the solution in this embodiment of this application, the target camera that is in the two cameras and that is farther away from the sound source object is determined based on the location of the sound source object and the locations of the two cameras, and a tracking operation on the target camera is determined based on the location of the sound source object and the location of the target camera. In this way, the face of the speaker can be better shot in a conventional conference scenario, and accuracy of automatic tracking is improved.

According to a second aspect, a tracking control apparatus is provided. The apparatus includes one or more modules, and the one or more modules are configured to implement the method in the first aspect and the possible implementations of the first aspect.

According to a third aspect, a computer device is provided. The computer device includes a memory and a processor. The memory is configured to store computer instructions. The processor executes the computer instructions stored in the memory, so that the computer device performs the method in the first aspect and the possible implementations of the first aspect.

According to a fourth aspect, a computer-readable storage medium is provided. The computer-readable storage medium stores computer program code, and when the computer program code is executed by a computer device, the computer device performs the method in the first aspect and the possible implementations of the first aspect.

According to a fifth aspect, a computer program product is provided. The computer program product includes computer program code, and when the computer program code is executed by a computer device, the computer device performs the method in the first aspect and the possible implementations of the first aspect.

Beneficial effects brought by the technical solutions provided in embodiments of this application are as follows.

In the solution in embodiments of this application, provided that the sound source object makes a sound, the sound source object can be located based on the sound. In this way, a speaker does not need to have an obvious movement (for example, an obvious mouth movement) when the sound source object is located based on image recognition. In this way, a limitation of an automatic tracking method based on image recognition in the conventional technology is eliminated, and tracking accuracy is improved.

DESCRIPTION OF EMBODIMENTS

Figure 1:
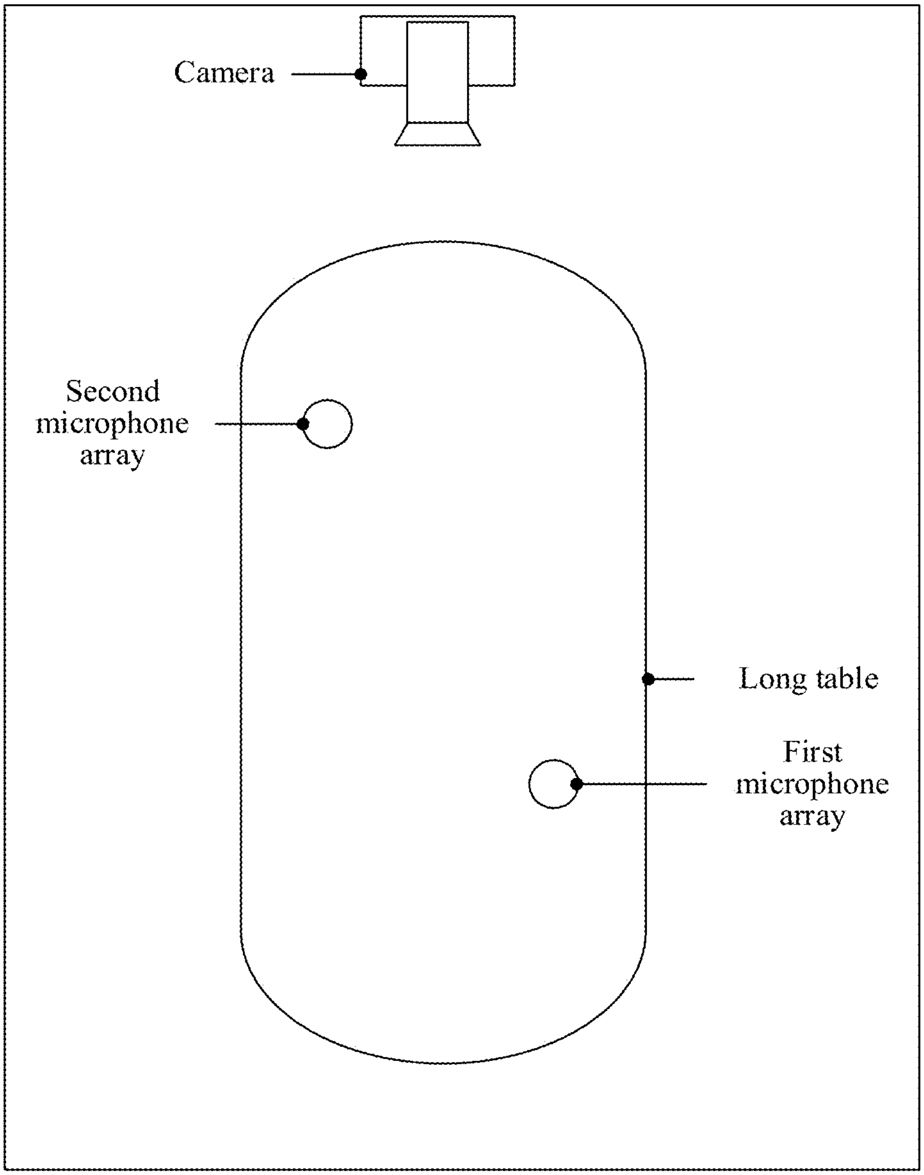
FIG. 1 is a schematic diagram of a tracking control system according to an embodiment of this application.

The following explains some terms used in embodiments.

Reference direction: All devices in a tracking control system may be directional devices. The directional device has a reference direction, which may also be referred to as a positive direction of the device. The reference direction of the device rotates with rotation of the device. The reference direction is generally set manually in a device production process, and a corresponding icon may be set on the device for marking, to facilitate installation by a user. For example, a reference direction of a pan-tilt-zoom camera is a direction of any specified radius of a pan-tilt-zoom base, and a line mark may be printed at a location of the radius on the pan-tilt-zoom base.

A characteristic of the directional device is that a real-time output parameter of the device includes an azimuth or a rotation angle (which is separately described below), and all such angle parameters need to be determined by using the reference direction as a reference.

An azimuth indicates an azimuth of an object B relative to a device A, and is an included angle from a reference direction of the device A to a line connecting an equivalent center of the object B and an equivalent center of the device A in a plane. In the embodiments, an anticlockwise included angle from the reference direction of the device A to the line connecting the equivalent center of the object B and the equivalent center of the device A in the plane is defined as the azimuth of the device B relative to the device A.

A deviation angle is an included angle between a reference direction of a device and a specified direction (which may be manually set). In the embodiments, an anticlockwise included angle from the reference direction of the device to the specified direction is defined as a deviation angle of the device in a plane.

Orientation: An orientation of a device is a direction of a reference direction of the device, and may be represented by an included angle (that is, a deviation angle of the device) between the reference direction of the device and a specified direction. The specified direction may be an X-axis direction or a Y-axis direction.

A specified direction is a direction that is set for determining a deviation angle of a device. In a tracking control system, different specified directions may be set for different devices, or a same specified direction may be set for different devices. When a rectangular coordinate system is established, the specified direction is a direction with a coordinate axis as a reference. As mentioned above, the deviation angle of the device uses the specified direction as a reference. Actually, the deviation angle of the device also uses the coordinate axis as a reference. In a tracking operation process, a reference direction of a microphone array is used as a reference for an orientation of a sound source object. Actually, the orientation of the sound source object may also be finally represented as an angle relative to the coordinate axis. In an actual application, for ease of calculation, the specified direction is usually set to a positive direction of a coordinate axis.

Rotation angle: A device C may include a component M and a component N. The component M is rotatably installed on the component N. A rotation angle of the component M is a rotation angle of a positive direction of the component M relative to a positive direction of the component N. Herein, the positive direction of the component N may be considered as a reference direction of the device C.

A sound source object is a person or object that makes a sound, and is usually a current speaker.

A shooting angle range is also referred to as an angle of view, and is a horizontal angle and a vertical angle at which a camera can currently shoot.

A longitudinal central axis of an image is an imaginary line that can evenly divide the image into two in a vertical direction of the image.

Sound emitter: The sound emitter in embodiments of this application is a component that can emit a sound under control of a control device. The following sound emitter may be an ultrasonic sound emitter, and the emitted sound is an ultrasonic wave.

Embodiments of this application provide a tracking control method, and the method may be applied to a tracking control system. The tracking control system may include a microphone array, a camera, a control device, and the like. There may be a plurality of types of microphone arrays, for example, a distributed microphone array ("distributed" means that the microphone array is not integrated on another device) or a microphone array integrated on another device. There may be a plurality of cameras, for example, a distributed camera or a camera integrated on another device. The control device may be an independent control device, or may be a control device integrated with a microphone array and/or a camera. The tracking control system may further include a device such as a terminal device (for example, a smart screen or a projector). One or more of the control device, the microphone array, and the camera may be integrated on the terminal device. The tracking control system may be used for shooting and tracking in a plurality of scenarios, for example, a conference scenario, a teaching scenario, or a program recording scenario. This embodiment is described by using a conference scenario as an example. Other cases are similar to this, and details are not described herein again.

There may be a plurality of conference scenarios. A very common conference scenario is a long-table conference scenario. In this conference scenario, a long conference table and several seats may be disposed, and the seats are arranged around the long conference table. During a conference, participants may sit on the seats for conferences. In this embodiment of this application, this conference scenario is used as an example for solution description.

As shown in FIG. 1, the tracking control system may include a first microphone array, a second microphone array, a control device, a camera, and the like. The first microphone array and the second microphone array may be distributed microphone arrays. A distributed microphone array can be placed in any location in the conference scenario. The control device may be an independent device, or may be integrated into a microphone array or the camera.

Before the control device performs the tracking control method, a plane coordinate system may be set. The plane coordinate system may be a two-dimensional rectangular coordinate system in a horizontal plane. Any point in conference room space may be set as an origin of the plane coordinate system. An X-axis direction and a Y-axis direction of the plane coordinate system may be any two directions perpendicular to each other in the horizontal plane. The control device may record locations, specified directions, and deviation angles of some or all devices such as a microphone array and the camera. A location of a device may be coordinates of a projection point of an equivalent center of the device in the plane coordinate system. Usually, an equivalent center of a device that does not move randomly in a location in a conference room is used as an origin of the coordinate system, and directions that use the device as a reference are an X-axis direction and a Y-axis direction. For example, an equivalent center of a conference terminal is used as the origin of the coordinate system, a normal direction of a screen of the conference terminal is used as the Y-axis direction, and a direction that is in the horizontal plane and that is perpendicular to the normal direction is used as the X-axis direction.

Based on the foregoing tracking control system, an embodiment of this application provides a tracking control method. The method may be performed by the control device in the tracking control system. The control device may be a server, a terminal, a component integrated in another device, or the like. The server can be a single server or a server group. The terminal may be a device disposed in the conference room, or a device disposed in an enterprise equipment room, or may be a portable device, such as a smart screen, a desktop computer, a notebook computer, a mobile phone, a tablet computer, or a smartwatch. The control device may be integrated in a device such as a smart screen, a camera, or a microphone array.

Figure 2:
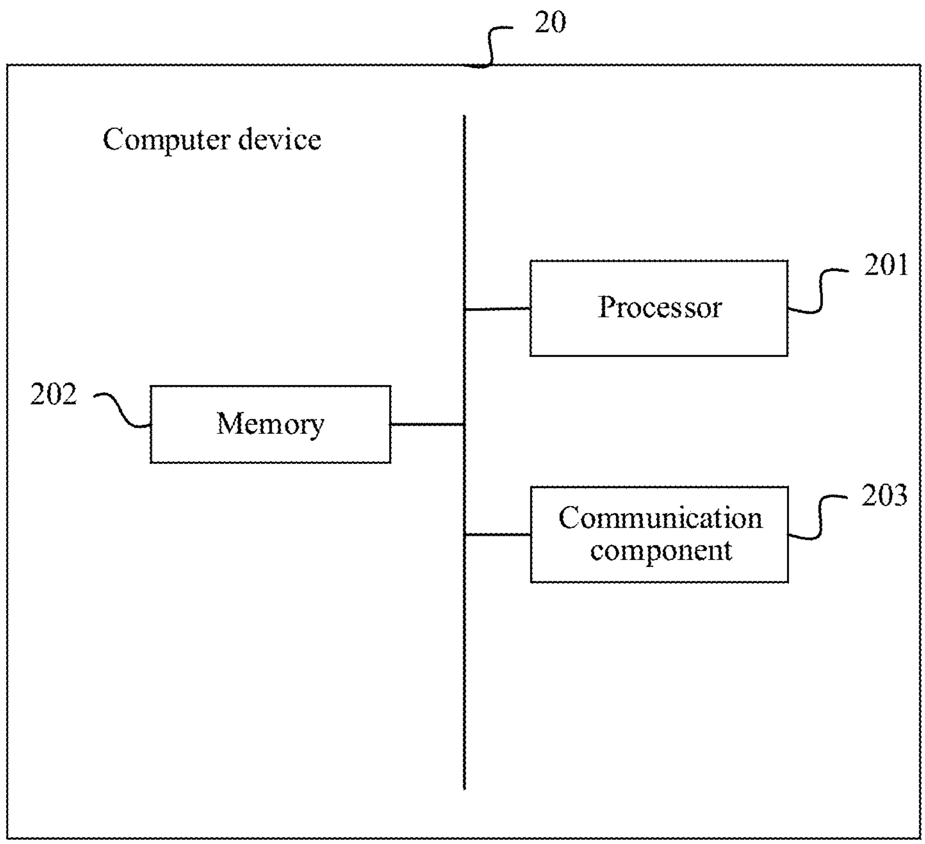
FIG. 2 is a schematic diagram of a structure of a computer device according to an embodiment of this application.

FIG. 2 is a schematic diagram of a structure of the control device according to an embodiment of this application. From a perspective of hardware composition, a structure of a control device 20 may be shown in FIG. 2, and includes a processor 201, a memory 202, and a communication component 203.

The processor 201 may be a central processing unit (CPU), a system on chip (SoC), or the like. The processor 201 may be configured to determine an azimuth $\theta_1$ of a sound source object relative to the first microphone array and an azimuth $\theta_2$ of the sound source object relative to the second microphone array, and may be further configured to determine a location of the sound source object and the like.

The memory 202 may include various volatile memories or non-volatile memories, for example, a solid-state disk (SSD) or a dynamic random access memory (DRAM). The memory 202 may be configured to store initial data, intermediate data, and result data that are used in a process in which tracking control is recorded, for example, detection data of the first microphone array, detection data of the second microphone array, the azimuth $\theta_1$ of the sound source object relative to the first microphone array, the azimuth $\theta_2$ of the sound source object relative to the second microphone array, a location of the first microphone array, a location of the second microphone array, and the location of the sound source object.

The communication component 203 may be a wired network connector, a wireless fidelity (Wi-Fi) module, a Bluetooth module, a cellular network communication module, or the like. The communication component 203 may be configured to perform data transmission with another device. The another device may be a server, a terminal, or the like. For example, the control device 20 may receive the detection data of the first microphone array and the detection data of the second microphone array, and may further send the location of the sound source object to a server for storage.

Figure 3:
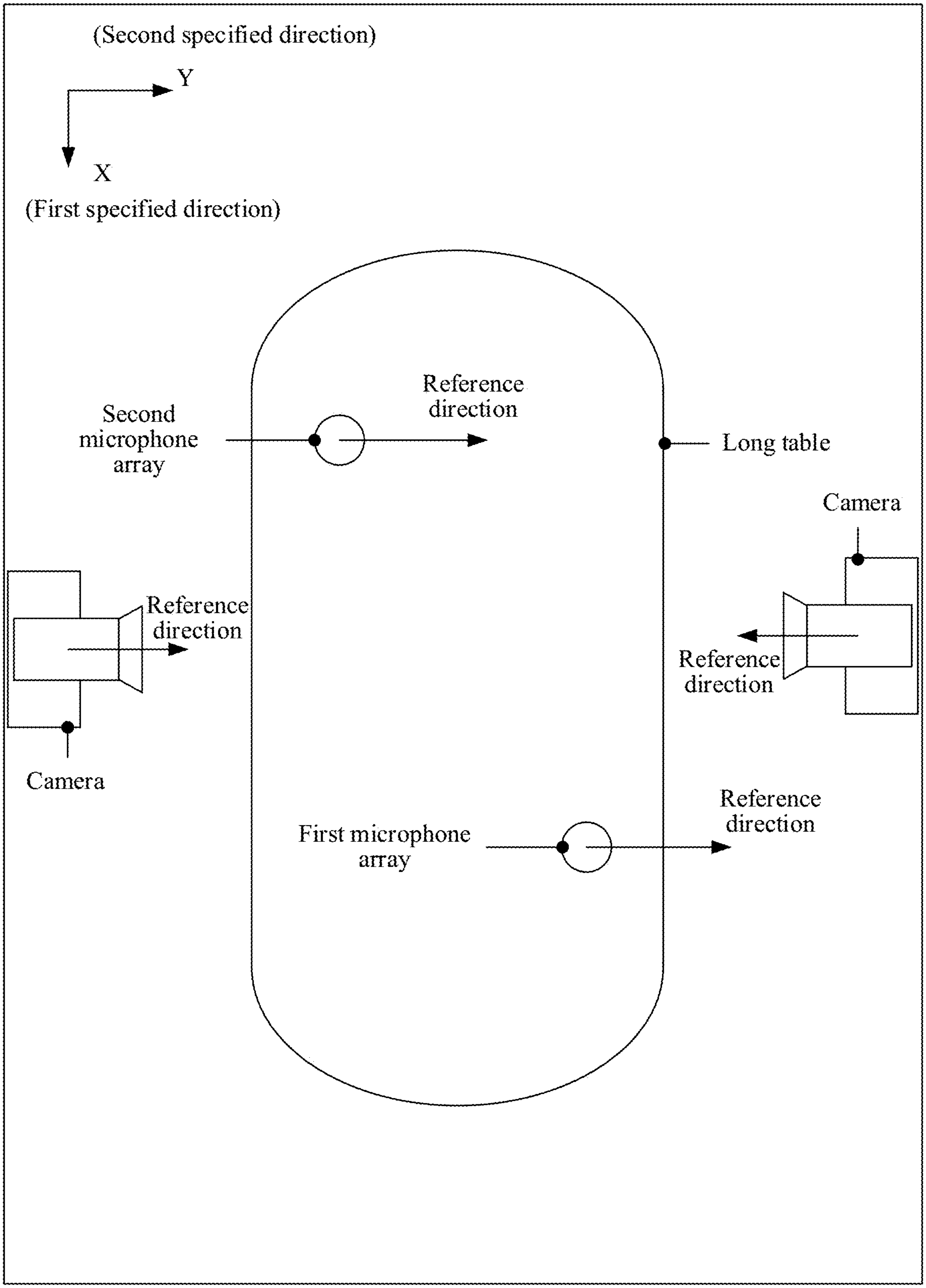
FIG. 3 is a schematic diagram of a tracking control system according to an embodiment of this application.

As shown in FIG. 3, the tracking control system may include a first microphone array, a second microphone array, and a camera. The first microphone array and the second microphone array are distributed microphone arrays. There may be one or more first microphone arrays. The camera may be a distributed camera, and there may be one or more cameras.

In a conference room, the foregoing devices may be disposed in any location. For example, in a conference room with a long table, the first microphone array and the second microphone array may be disposed on the long table, and two cameras may be suspended on walls on two sides of the long table. The control device may record locations and deviation angles of devices such as the first microphone array, the second microphone array, and the cameras. A location of a device may be coordinates of a projection point of an equivalent center of the device in a plane coordinate system.

Figure 4:
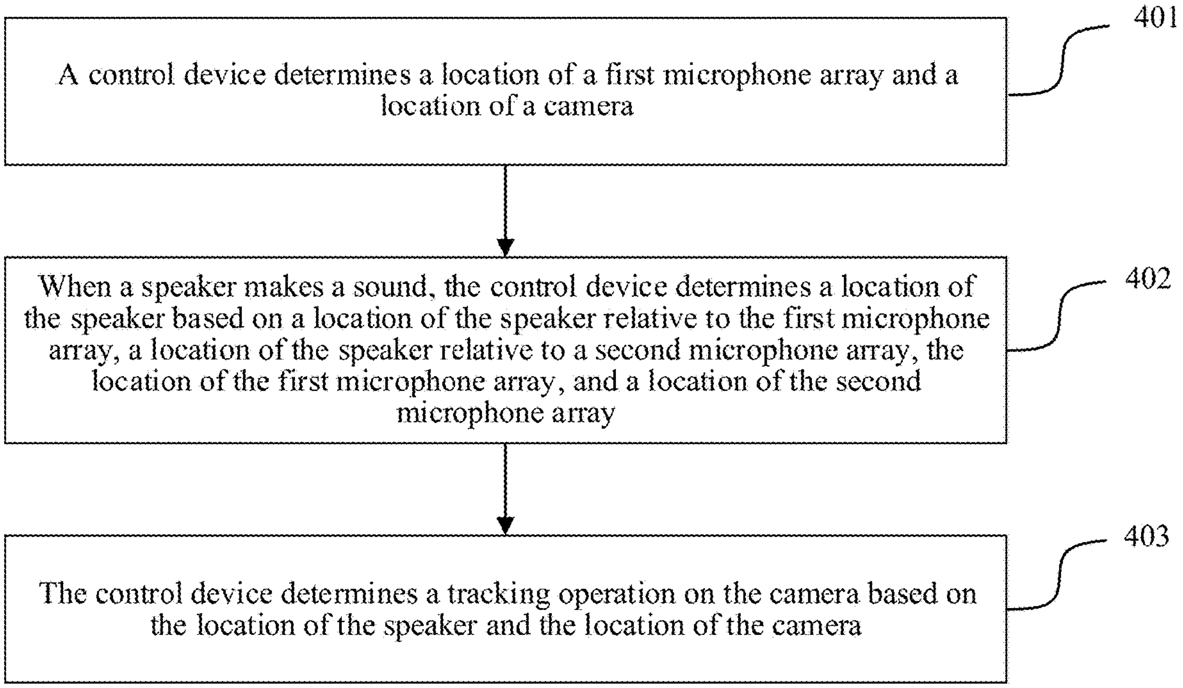
FIG. 4 is a flowchart of a tracking control method according to an embodiment of this application.

The following describes in detail a processing procedure of a tracking control method provided in an embodiment of this application for the tracking control system shown in FIG. 3. The processing procedure may be shown in FIG. 4. In this embodiment of this application, an example in which a sound source object is a speaker in a conference scenario is used for description. Other cases are similar, and details are not described herein again.

401: The control device determines a location of the first microphone array and a location of the camera.

The control device may obtain a prestored location of the first microphone array and a prestored location of the camera. Alternatively, the control device may determine the location of the first microphone array and the location of the camera by using a parameter calibration process, and a specific parameter calibration processing process is described in detail in the following.

402: When the speaker makes a sound, the control device determines a location of the speaker based on a location of the speaker relative to the first microphone array, a location of the speaker relative to the second microphone array, the location of the first microphone array, and a location of the second microphone array.

The location of the speaker relative to the first microphone array and the location of the speaker relative to the second microphone array may be represented by azimuths.

Figure 5:
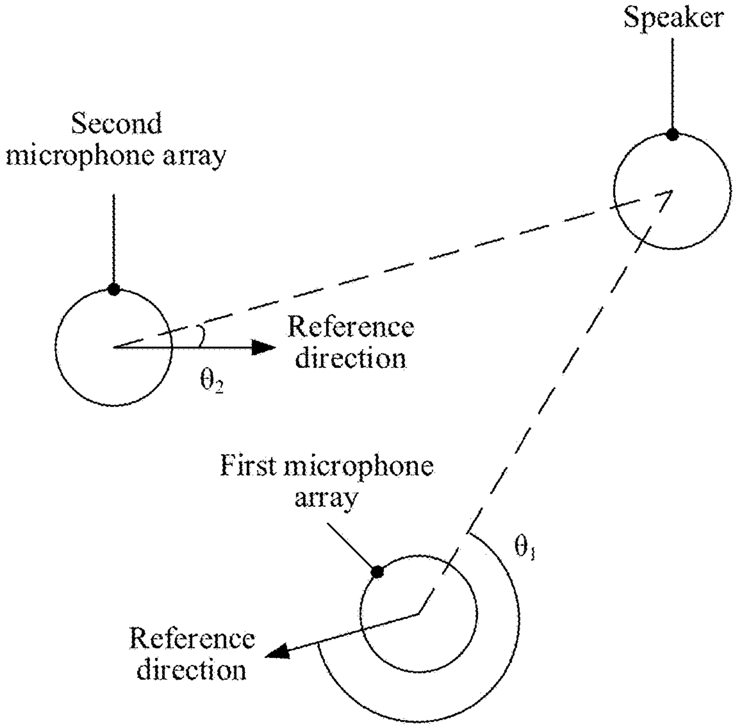
FIG. 5 is a schematic diagram of processing according to an embodiment of this application.

When the speaker speaks, each microphone in the first microphone array may detect corresponding audio data, and the first microphone array sends the audio data to the control device. The control device may perform sound source localization based on the audio data, and determine an azimuth $\theta_1$ of the speaker relative to the first microphone array. An algorithm used in a sound source localization process may be a steered-response power (SRP) algorithm or the like. Similarly, the control device may also perform sound source localization based on audio data detected by a microphone in the second microphone array, and determine an azimuth $\theta_2$ of the speaker relative to the second microphone array. Refer to FIG. 5. The azimuth $\theta_1$ is an anticlockwise included angle from a reference direction of the first microphone array to a line connecting the speaker and the first microphone array in a horizontal plane, and the azimuth $\theta_2$ is an anticlockwise included angle from a reference direction of the second microphone array to a line connecting the speaker and the second microphone array in the horizontal plane.

The following describes how to determine the location of the speaker in two cases:

Case 1

When deviation angles of the first microphone array and the second microphone are both 0 degrees, the control device may obtain the location of the speaker through calculation based on the azimuth $\theta_1$, the azimuth $\theta_2$, the location of the first microphone array, the location of the second microphone array, and a geometric relationship between the first microphone array, the second microphone array, and the speaker.

Figure 6:
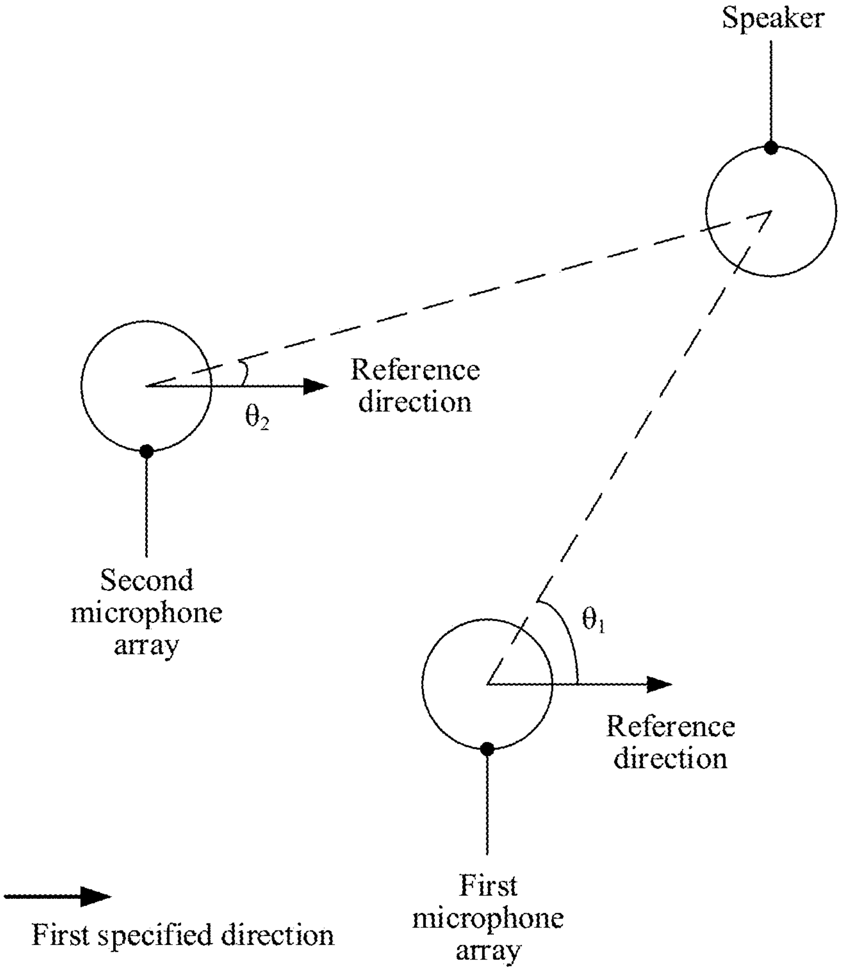
FIG. 6 is a schematic diagram of processing according to an embodiment of this application.

Refer to FIG. 6. Location coordinates of the speaker are represented as $(x,y)$, coordinates of the first microphone array are represented as $(x_1,y_1)$, and coordinates of the second microphone array are represented as $(x_2,y_2)$. A calculation process may be as follows:

$$\tan\theta_1 = \frac{y-y_1}{x-x_1}$$

$$\tan\theta_2 = \frac{y-y_2}{x-x_2}$$

The location coordinates $(x,y)$ of the speaker can be obtained through further calculation.

Case 2

Figure 7:
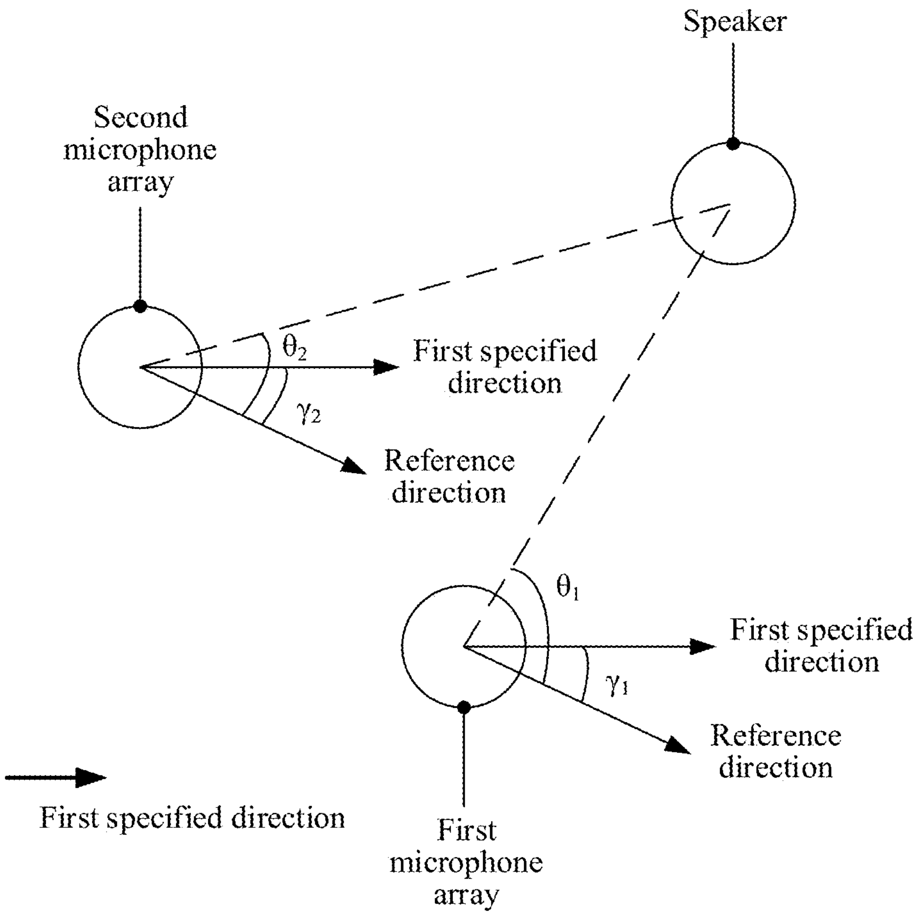
FIG. 7 is a schematic diagram of processing according to an embodiment of this application.

When neither of the deviation angles of the first microphone array and the second microphone array is 0 degrees, the control device may obtain the location of the speaker through calculation based on the deviation angle $\gamma_1$ of the first microphone array, the deviation angle $\gamma_2$ of the second microphone array, the azimuth $\theta_1$, the azimuth $\theta_2$, the location of the first microphone array, the location of the second microphone array, and the geometric relationship between the first microphone array, the second microphone array, and the speaker. Refer to FIG. 7. Location coordinates of the speaker are represented as $(x,y)$, coordinates of the first microphone array are represented as $(x,y)$, and coordinates of the second microphone array are represented as $(x_2,y_2)$. A calculation process may be as follows:

$$\tan(\theta_1-\gamma_1) = \frac{y-y_1}{x-x_1}$$

$$\tan(\theta_2-\gamma_2) = \frac{y-y_2}{x-x_2}$$

The location coordinates $(x,y)$ of the speaker can be obtained through further calculation.

It should be noted that there are a plurality of possible location relationships between the first microphone array, the second microphone array, and the speaker. The foregoing description process is described by using only one of the location relationships as an example. For another possible location relationship, the location of the speaker may be obtained through a geometric operation based on the foregoing related data. The location relationship and the calculation method used in the foregoing description process do not constitute a limitation on this embodiment.

403: The control device determines a tracking operation on the camera based on the location of the speaker and the location of the camera.

After determining the location of the speaker, the control device may calculate an azimuth of the speaker relative to the camera and a distance between the speaker and the camera based on the location of the speaker and the location of the camera. The distance is a plane equivalent distance, that is, a projection distance between an equivalent center of the camera and an equivalent center of the speaker in a plane.

Then, a tracking rotation angle of the camera may be determined based on the azimuth of the speaker relative to the camera. The camera may include a rotatable camera head and a fixed base. The camera head may rotate relative to the fixed base, and an initial shooting direction may be specified for the camera head. The initial shooting direction may be the same as a reference direction of the camera head. The tracking rotation angle may be an angle of a real-time shooting direction of the camera head relative to the initial shooting direction. The initial shooting direction may be considered as a 0-degree direction. The tracking rotation angle and the azimuth of the speaker relative to the camera may be the same.

After the distance between the speaker and the camera is determined, a tracking focal length of the camera may be determined based on the distance. The control device may search a prestored first correspondence table, to determine the tracking focal length corresponding to the distance. The first correspondence table may record a correspondence between a distance of the speaker relative to the camera and a focal length of the camera.

The following describes how to control the tracking operation on the camera in two cases:

Case 1

When the deviation angle of the camera is 0 degrees, the control device may determine the tracking rotation angle and the tracking focal length of the camera based on the location of the speaker and the location of the camera, to control the camera to rotate to the tracking rotation angle and control the camera to perform shooting based on the tracking focal length.

Case 2

When a deviation angle of the camera is not 0 degrees, the control device may determine the tracking rotation angle and the tracking focal length of the camera based on the deviation angle of the camera, the location of the speaker, and the location of the camera, to control a pan-tilt-zoom of the camera to rotate to the tracking rotation angle and control the camera to perform shooting based on the tracking focal length.

It should be noted that in the foregoing example of the tracking control system, a plurality of camera heads may be added and arranged in different locations, to better shoot a participant. The following describes several different processing manners for a case of a plurality of camera heads:

Manner 1: When there are at least two camera heads in the tracking control system, the control device may determine, based on the location of the speaker and locations of two cameras, a target camera that is in the two cameras and that is farther away from the speaker, and determine a tracking operation on the target camera based on the location of the speaker and a location of the target camera.

This processing manner is applicable to the following scenario: A long table is arranged in a conference room, several chairs are arranged on both sides of the long table, and the speaker sits on the chair facing the long table. Cameras are disposed on walls on both sides of the long table. In this scenario, for the two cameras that are disposed on the walls on both sides of the long table, the camera farther away from the speaker can better capture the face of the speaker. Therefore, the camera that is in the two cameras and that is farther away from the speaker may be determined as the target camera, and then the tracking operation on the target camera is determined based on the location of the speaker and the location of the target camera.

Manner 2: The control device may control, based on the location of the sound source object and locations of the plurality of cameras, the plurality of cameras to shoot the sound source object, to obtain a plurality of video images. Then, image recognition may be performed on the plurality of obtained video images, and a video image that meets a target condition is selected as a tracking video image. There may be a plurality of target conditions. For example, a video image in which a face angle is closest to the front is selected as the tracking video image. A face angle in the video image may be determined by using a machine learning model for face angle detection.

In the foregoing process of locating the speaker, parameters that may be involved include a location of each device and a deviation angle of each device. All these parameters may be recorded into the control device in advance, and may be measured and recorded after installation. Alternatively, these parameters may be recorded before delivery of the device, and in this case, the factory configuration needs to be considered during installation. Some of these parameters may also be recorded into the control device in advance, and the other parameters may be measured through a parameter calibration process. Specifically, parameters that need to be recorded in advance and parameters that need to be calibrated may be determined based on a device condition in the navigation control system. For example, parameters of a device whose location may change at any time need to be calibrated, for example, a distributed microphone array, and parameters of a device whose location is fixed may be recorded in advance, for example, a microphone array integrated on a conference terminal.

A person skilled in the art may record a location and a deviation angle of a specified device into the control device in advance, and then the control device determines a location and a deviation angle of another device other than the specified device through a parameter calibration process. For example, the specified device may be a microphone array. The following describes the parameter calibration process in detail for the tracking control system in different cases.

Figure 8:
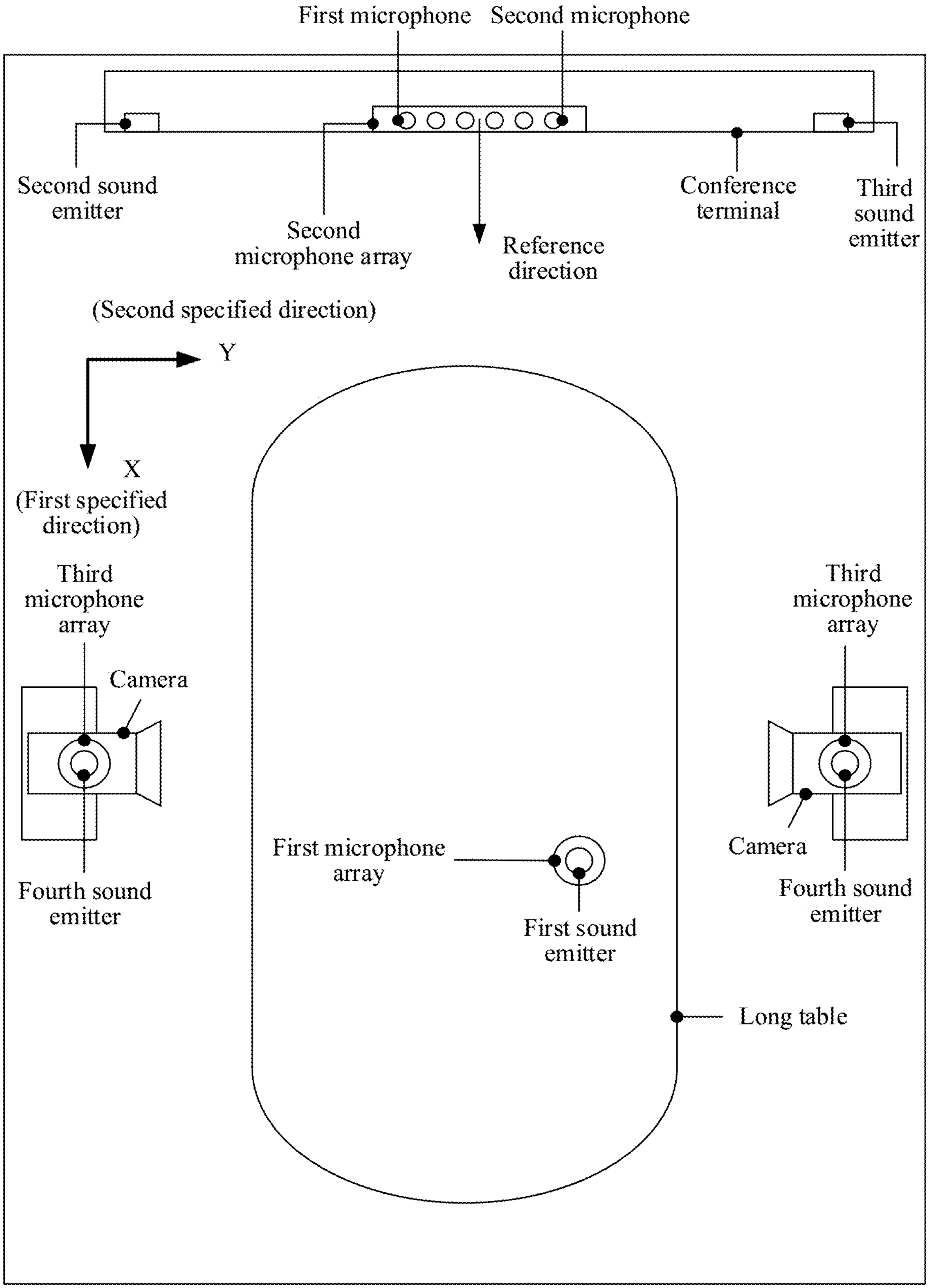
FIG. 8 is a schematic diagram of a tracking control system according to an embodiment of this application.

Case 1: As shown in FIG. 8, the tracking control system may include a first microphone array, a conference terminal, and a camera. The first microphone array is a distributed microphone array, and may be integrated with a first sound emitter. There may be one or more first microphone arrays. The conference terminal may be a smart screen, and the conference terminal may be integrated with a control device, a second microphone array, a second sound emitter, and a third sound emitter. The camera may be a distributed camera, and may be integrated with a fourth sound emitter and a third microphone array. There may be one or more cameras. There may be a variety of possibilities for a sound emitter, for example, a common loudspeaker or an ultrasonic sound emitter.

In a conference room, locations of the foregoing devices may be set randomly. For example, in a conference room with a long table, the conference terminal is installed on a wall at one end of the long table, the second microphone array is installed in a middle location at the top of the conference terminal, the second sound emitter and the third sound emitter are installed on two sides of the conference terminal, the first microphone array may be disposed on the long table, and two cameras may be suspended on walls at two sides of the long table.

The control device may prerecord a location of the second microphone array, a deviation angle of the second microphone array, a location of a first microphone in the second microphone array, a location of a second microphone in the second microphone array, a location of the second sound emitter, and a location of the third sound emitter, and prerecord a first specified direction corresponding to the first microphone array and a second specified direction corresponding to the camera. For example, the control device establishes a plane rectangular coordinate system in a horizontal plane by using a central location of the second microphone array as an origin of coordinates and using a reference direction of the second microphone array as an X-axis positive direction. Alternatively, the reference direction of the second microphone array may be set as a screen direction, and the first microphone and the second microphone in the second microphone array may be symmetrically disposed on the conference terminal relative to the central location. A distance between microphones in a microphone array is generally clear. When a distance between the first microphone and the second microphone is D, location coordinates of the first microphone may be recorded as (0, −D/2), and location coordinates of the second microphone may be recorded as (0, D/2). Similarly, the second sound emitter and the third sound emitter are usually symmetrically disposed on the conference terminal relative to the central location. When a distance between the second sound emitter and the third sound emitter is L, location coordinates of the second sound emitter may be recorded as (0, −L/2), and location coordinates of the third sound emitter may be recorded as (0, L/2). The locations of the first microphone, the second microphone, the second sound emitter, and the third sound emitter may be prestored before the conference terminal is delivered from a factory. In addition, the first specified direction corresponding to the first microphone array may be set and recorded as an X-axis positive direction, and the second specified direction corresponding to the camera may be a Y-axis positive direction.

Based on the foregoing tracking control system, the following separately describes a process of calibrating the location of the first microphone array, the deviation angle of the first microphone array, the location of the camera, and the deviation angle of the camera.

(1) Calibration of the Location of the First Microphone Array (if there are a Plurality of First Microphone Arrays, a Location of Each First Microphone Array May be Calibrated in the Following Processing Manner):

The control device controls the first sound emitter to emit a sound signal $S_1$, and determines a distance $D_1$ between the first microphone and the first sound emitter and a distance $D_2$ between the second microphone and the first sound emitter based on a time point at which the first sound emitter emits the sound signal $S_1$ and time points at which the first microphone and the second microphone in the second microphone array detect the sound signal $S_1$. The control device determines locations of the first sound emitter and the first microphone array based on the location of the first microphone, the location of the second microphone, the distance $D_1$, and the distance $D_2$.

Equivalent centers of the first sound emitter and the first microphone array may be the same. That is, a location of the first sound emitter and the location of the first microphone array may be the same.

During implementation, when the control device controls the first sound emitter to emit the sound signal $S_1$, the first sound emitter sends, to the control device for recording, a time point $t_1$ at which the sound signal $S_1$ is emitted. Each microphone in the second microphone array may receive a sound signal, record a time point at which the sound signal is detected, and send the time point to the control device. The control device may obtain a time point $t_2$ at which the first microphone in the second microphone array detects the sound signal $S_1$ and a time point $t_3$ at which the second microphone in the second microphone array detects the sound signal $S_1$, and then may obtain, through calculation, duration $\Delta T_1$ between the time point $t_1$ and the time point $t_2$ and duration $\Delta T_2$ between the time point $t_1$ and the time point $t_3$. Further, the control device may obtain, through calculation, the distance $D_1$ between the first microphone and the first sound emitter and the distance $D_2$ between the second microphone and the first sound emitter based on prestored sound speed data V.

Figure 9:
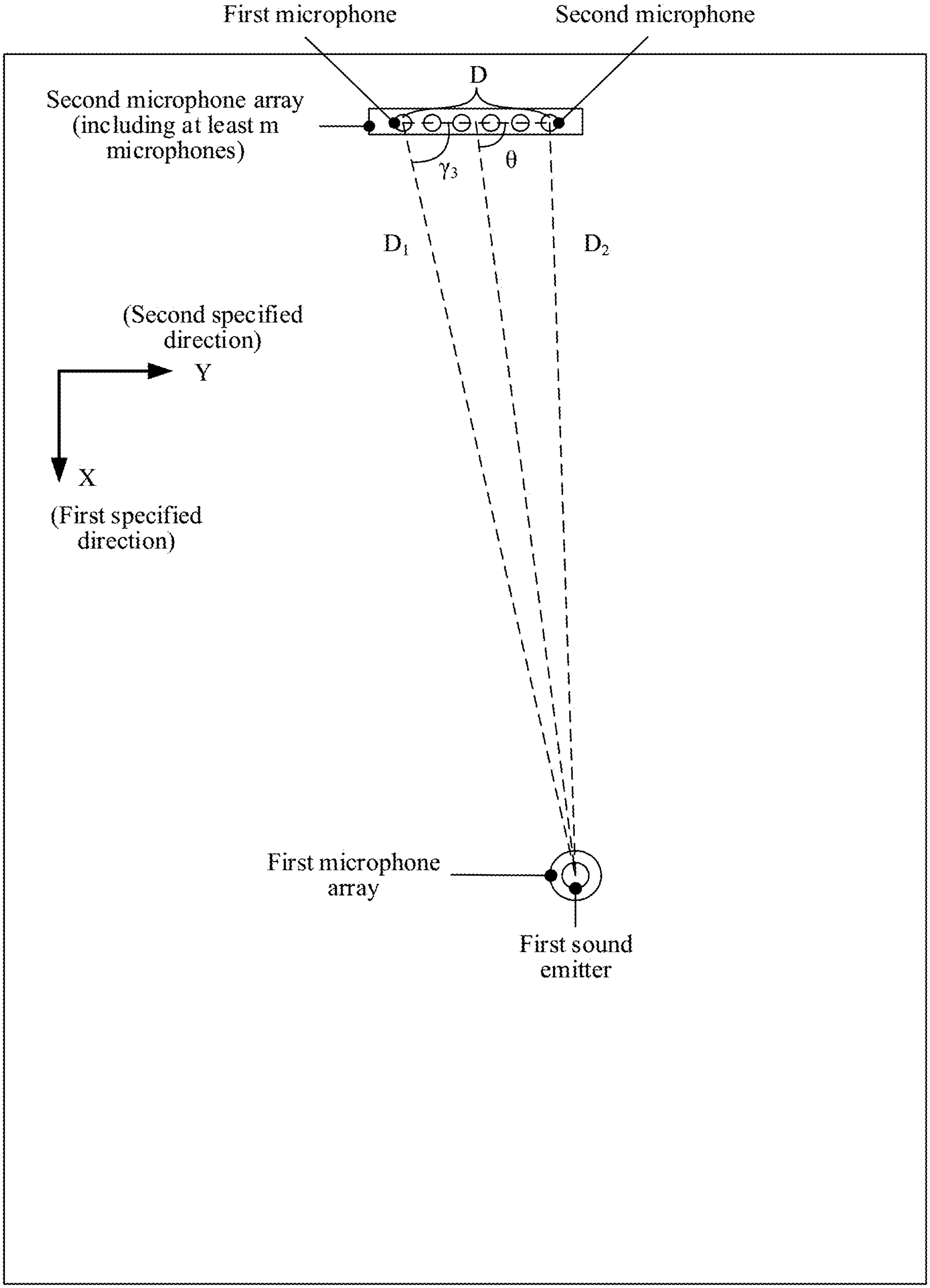
FIG. 9 is a schematic diagram of processing according to an embodiment of this application.

Based on the locations of the first microphone and the second microphone, it may be determined that the distance between the first microphone and the second microphone is D. Then, the control device may obtain the location of the first sound emitter through calculation based on the distance D, the distance $D_1$, and the distance $D_2$, and a geometric relationship between the first microphone, the second microphone, and the first sound emitter. Refer to FIG. 9. An anticlockwise included angle from a line connecting the first microphone and the first sound emitter to a line connecting the first microphone and the second microphone in a horizontal plane is represented as $\gamma_3$, and coordinates of the first sound emitter are represented as $(x,y)$. A calculation process may be as follows:

$$\cos\gamma_3 = \frac{D_1^2 + D^2 - D_2^2}{2 \cdot D_1 \cdot D}$$

$$y_1 = D_1 \cdot \frac{D_1^2 + D^2 - D_2^2}{2 \cdot D_1 \cdot D} - \frac{D}{2}$$

$$x_1 = \sqrt{D_1^2 - \left(y_1 + \frac{D}{2}\right)^2}$$

It should be noted that there are a plurality of possible location relationships between the first microphone, the second microphone, and the first sound emitter. The foregoing description process is described by using only one of the location relationships as an example. For another possible location relationship, the location of the first sound emitter may be obtained through a geometric operation based on the foregoing related data. The location relationship and the calculation method used in the foregoing description process do not constitute a limitation on this embodiment.

Based on FIG. 9, a principle of calculating an azimuth is described, that is, the SRP algorithm above is described.

The calculation formula of this algorithm is as follows:

$$Y(\theta) = \sum_{K} \sum_{m=1}^{M} \frac{X_m(k)}{|X_m(k)|} s(\theta)$$

$X_m(k)$ represents a fast Fourier transform (FFT) value of a frequency band k of the $m^{th}$ microphone, and s(θ) represents a steering vector corresponding to a sound source located at an angle θ in a two-dimensional space plane. The steering vector may be calculated in advance based on a layout of microphones in a microphone array and an angle search range (which is set manually, and is an angle range for determining a maximum extreme point subsequently). A linear layout of microphones in the microphone array is used as an example, and a calculation formula of the steering vector is:

$$s(\theta) = \begin{bmatrix} 1 \\ e^{j\frac{2\pi c}{f}d_1 cos\theta} \\ e^{j\frac{2\pi c}{f}d_2 cos\theta} \\ e^{j\frac{2\pi c}{f}d_3 cos\theta} \\ \vdots \\ e^{j\frac{2\pi c}{f}d_m cos\theta} \end{bmatrix}$$

The first microphone is selected as a reference microphone. $d_m$ cos θ represents a difference between distances from the sound source to the $m^{th}$ microphone and the reference microphone.

For single sound source localization, when θ belongs to the angle search range, an angle θ corresponding to a maximum extreme point of Y(θ) is determined, that is, an azimuth of the sound source object.

(2) Calibration of the Deviation Angle of the First Microphone Array (if there are a Plurality of First Microphone Arrays, a Deviation Angle of Each First Microphone Array May be Calibrated in the Following Processing Manner):

The deviation angle of the first microphone array is an included angle of a reference direction of the first microphone array relative to the first specified direction, and the first specified direction may be an X-axis positive direction.

The control device controls the second sound emitter to emit a sound signal $S_2$, and determines an azimuth $\theta_3$ of the second sound emitter relative to the first microphone array based on detection data of the first microphone array. The control device controls the third sound emitter to emit a sound signal $S_3$, determines an azimuth $\theta_4$ of the third sound emitter relative to the first microphone array based on the detection data of the first microphone array, and determines a deviation angle $\theta_5$ of the first microphone array based on the azimuth $\theta_3$, the azimuth $\theta_4$, the location of the second sound emitter, and the location of the third sound emitter.

Figure 10:
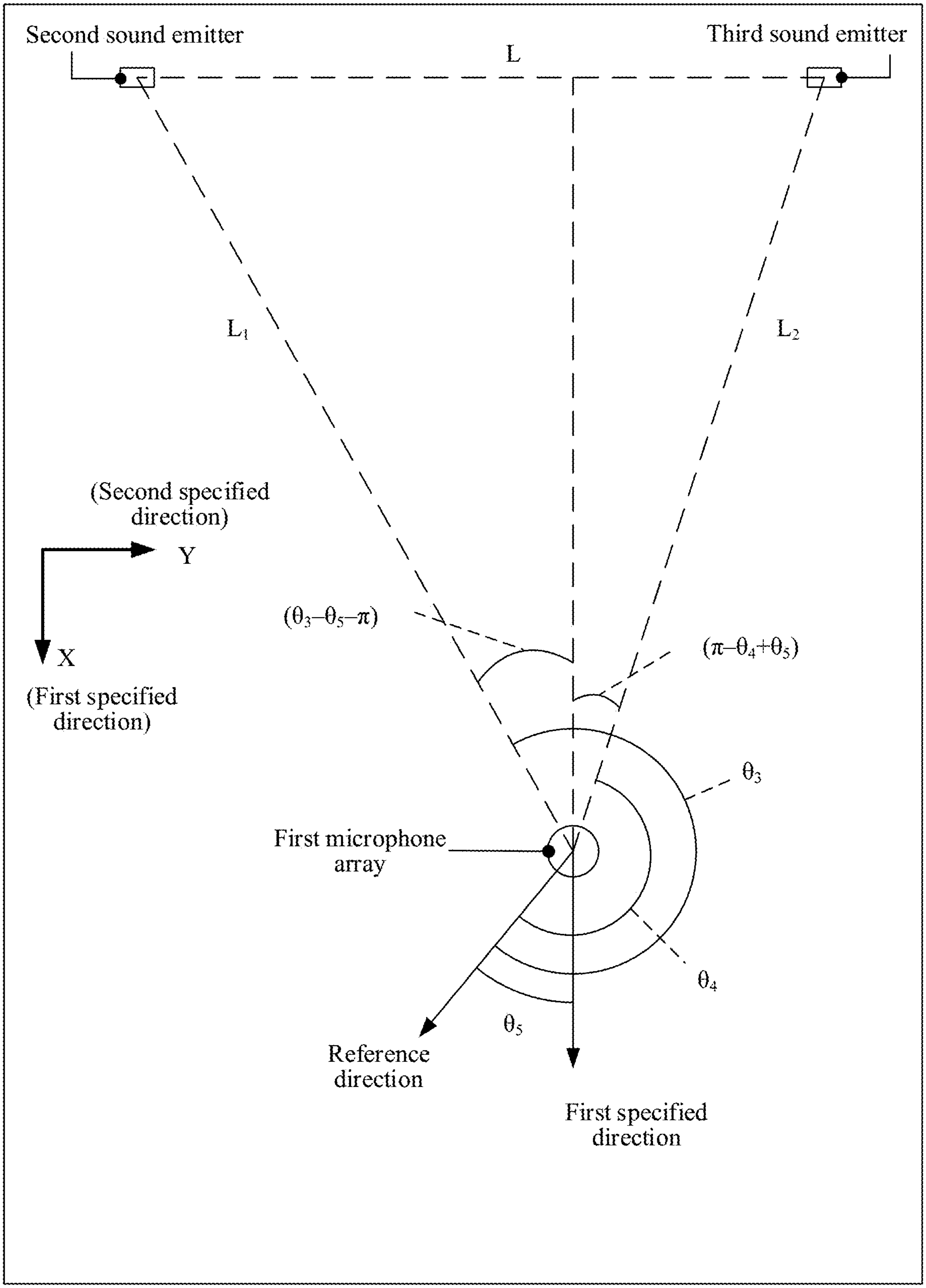
FIG. 10 is a schematic diagram of processing according to an embodiment of this application.

During implementation, when the second sound emitter emits the sound signal $S_2$, each microphone in the first microphone array may detect corresponding audio data, and the first microphone array sends the audio data to the control device. The control device may perform sound source localization based on the audio data, and determine the azimuth $\theta_3$ of the second sound emitter relative to the first microphone array. Similarly, when the third sound emitter makes a sound, the control device may also perform sound source localization based on audio data detected by a microphone in the first microphone array, and determine the azimuth $\theta_4$ of the third sound emitter relative to the first microphone array. The control device may determine a distance L between the second sound emitter and the third sound emitter based on location coordinates of the second sound emitter and location coordinates of the third sound emitter. Then, the control device may determine the deviation angle $\theta_5$ of the first microphone array through calculation based on the azimuth $\theta_3$, the azimuth $\theta_4$, the location of the second sound emitter, the location of the third sound emitter, and a location relationship between the first microphone array, the second sound emitter, and the third sound emitter. Refer to FIG. 10. Coordinates of the first microphone array are represented as $(x,y)$, coordinates of the second sound emitter are represented as (0, −L/2), coordinates of the third sound emitter are represented as (0, L/2), a distance between the second sound emitter and the first microphone array is represented as $L_1$, and a distance between the third sound emitter and the first microphone array is represented as $L_2$. A calculation process may be as follows:

$$L_1 = \sqrt{{x_1}^2 + \left(y_1 + \frac{L}{2}\right)^2}$$

$$L_2 = \sqrt{{x_1}^2 + \left(y_1 - \frac{L}{2}\right)^2}$$

$$\cos(\theta_3 - \theta_5 - \pi) \cdot L_1 = \cos(\pi - \theta_4 + \theta_5) \cdot L_2$$

$$\sin(\theta_3 - \theta_5 - \pi) \cdot L_1 + \sin(\pi - \theta_4 + \theta_5) \cdot L_2 = L$$

$$\cos(\theta_3 - \theta_4) = \frac{{L_1}^2 + {L_2}^2 - L^2}{2 \cdot L_1 \cdot L_2}$$

The deviation angle $\theta_5$ may be obtained through further calculation.

It should be noted that there are a plurality of possible location relationships between the first microphone array, the second sound emitter, and the third sound emitter. The foregoing description process is described by using only one of the location relationships as an example. For another possible location relationship, the deviation angle of the first microphone array may be obtained through a geometric operation based on the foregoing related data. The location relationship and the calculation method used in the foregoing description process do not constitute a limitation on this embodiment.

(3) Calibration of the Location of the Camera (if there are a Plurality of Cameras, a Location of Each Camera May be Calibrated in the Following Processing Manner):

The control device controls the fourth sound emitter to emit a sound signal $S_4$, and determines a distance $D_3$ between the first microphone and the fourth sound emitter and a distance $D_4$ between the second microphone and the fourth sound emitter based on a time point at which the fourth sound emitter emits the sound signal $S_4$ and time points at which the first microphone and the second microphone in the second microphone array detect the sound signal $S_4$. The control device determines locations of the fourth sound emitter and the camera based on the location of the first microphone, the location of the second microphone, the distance $D_3$, and the distance $D_4$.

Equivalent centers of the fourth sound emitter and the camera may be the same. That is, a location of the fourth sound emitter may be the same as the location of the camera.

During implementation, when controlling the fourth sound emitter to emit the sound signal $S_4$, the control device may record the time point $t_4$ at which the fourth sound emitter emits the sound signal $S_4$. Each microphone in the second microphone array may detect corresponding audio data, and record a detection time point corresponding to the audio data, that is, a time point at which the audio data is detected. The control device may obtain a time point $t_5$ at which the first microphone in the second microphone array detects the sound signal $S_4$ and a time point $t_6$ at which the second microphone in the second microphone array detects the sound signal $S_4$, and then may obtain, through calculation, duration $\Delta T_3$ between the time point $t_4$ and the time point $t_5$ and duration $\Delta T_4$ between the time point $t_4$ and the time point $t_6$. Further, the control device may obtain, through calculation, the distance $D_3$ between the first microphone and the fourth sound emitter and the distance $D_4$ between the second microphone and the fourth sound emitter based on prestored sound speed data V.

Based on the locations of the first microphone and the second microphone, it may be determined that the distance between the first microphone and the second microphone is D. Then, the control device may obtain the location of the fourth sound emitter through calculation based on the distance D, the distance $D_3$, and the distance $D_4$, and a geometric relationship between the first microphone, the second microphone, and the fourth sound emitter. A calculation process of determining the location of the fourth sound emitter is similar to the process of determining the location of the first sound emitter in Case 1, and reference may be made to related description of calibration of the location of the first microphone array in Case 1.

(4) Calibration of the Deviation Angle of the Camera (if there are a Plurality of Cameras, a Deviation Angle of Each Camera May be Calibrated in the Following Processing Manner):

The control device controls the first sound emitter to emit a sound signal $S_5$, determines an azimuth $\theta_6$ of the first sound emitter relative to the third microphone array based on detection data of the third microphone array, controls the fourth sound emitter to emit a sound signal $S_6$, and determines an azimuth $\theta_7$ of the fourth sound emitter relative to the first microphone array based on detection data of the first microphone array. The control device determines a deviation angle $\theta_8$ of the third microphone array and the camera based on the azimuth $\theta_6$, the azimuth $\theta_7$, and the deviation angle $\theta_5$ of the first microphone array.

An equivalent center of the third microphone array may be the same as an equivalent center of the camera. That is, a location of the third microphone array may be the same as the location of the camera. A deviation angle of the third microphone array may be the same as the deviation angle of the camera. An equivalent center of the fourth sound emitter may be the same as the equivalent center of the camera. That is, a location of the fourth sound emitter may be the same as the location of the camera.

During implementation, when the first sound emitter emits the sound signal $S_5$, each microphone in the third microphone array may detect corresponding audio data, and the third microphone array sends the audio data to the control device. The control device may perform sound source localization based on the audio data, and determine the azimuth $\theta_6$ of the first sound emitter relative to the third microphone array. Similarly, when the fourth sound emitter makes a sound, the control device may also perform sound source localization based on audio data detected by a microphone in the first microphone array, and determine the azimuth $\theta_7$ of the fourth sound emitter relative to the first microphone array.

Figure 11:
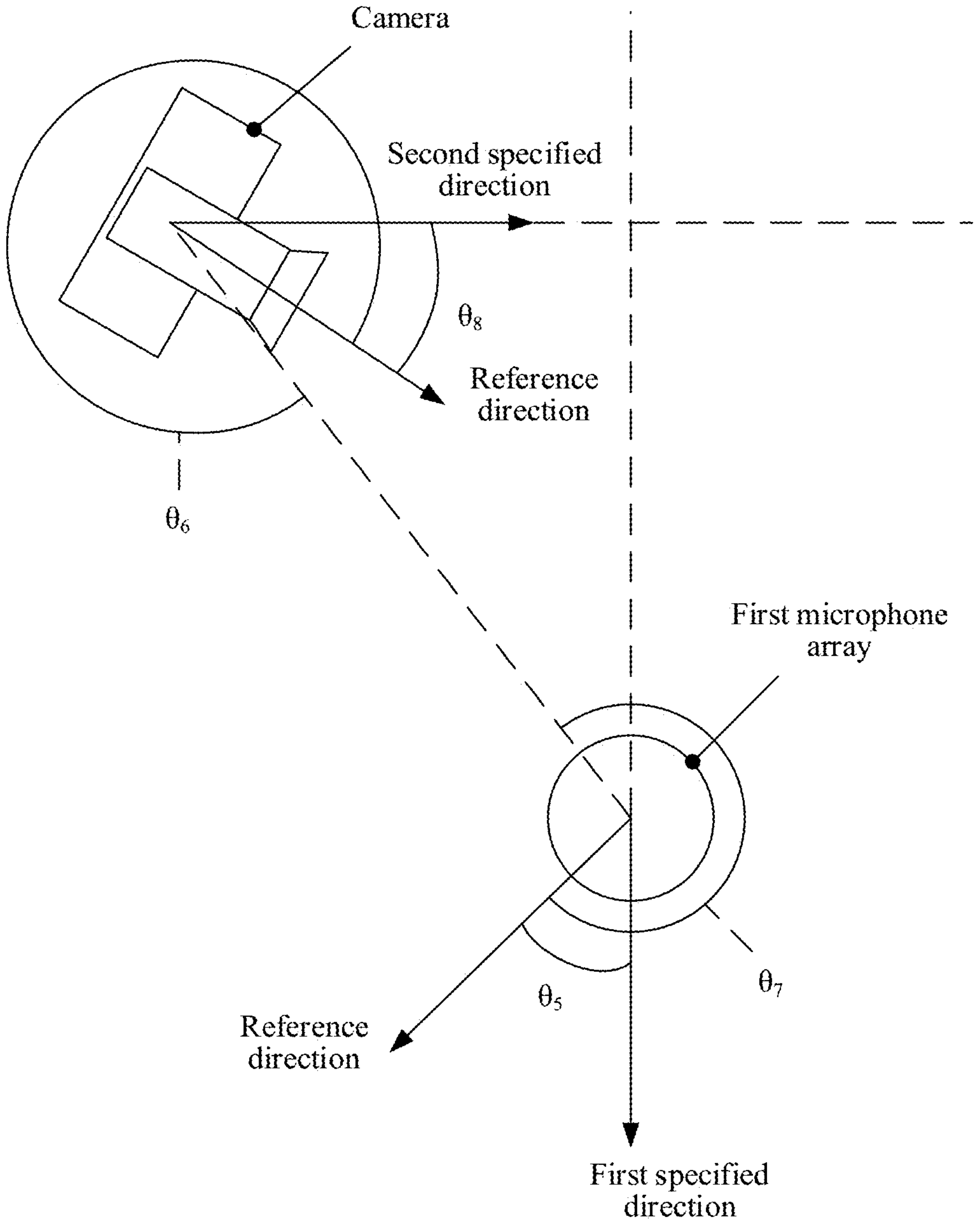
FIG. 11 is a schematic diagram of processing according to an embodiment of this application.

The deviation angle $\theta_8$ of the third microphone and the camera may be obtained through calculation based on the azimuth $\theta_6$, the azimuth $\theta_7$, the deviation angle $\theta_5$, and a geometric relationship between the first sound emitter, the third microphone array, and the fourth sound emitter. Refer to FIG. 11. A calculation process may be as follows:

$$\theta_8 = \theta_5 + \theta_6 - \theta_7 - \frac{\pi}{2}$$

It should be noted that there are a plurality of possible location relationships between the first sound emitter, the third microphone array, and the fourth sound emitter. The foregoing description process is described by using only one of the location relationships as an example. For another possible location relationship, the deviation angles of the third microphone array and the camera may be obtained through a geometric operation based on the foregoing related data. The location relationship and the calculation method used in the foregoing description process do not constitute a limitation on this embodiment.

Figure 12:
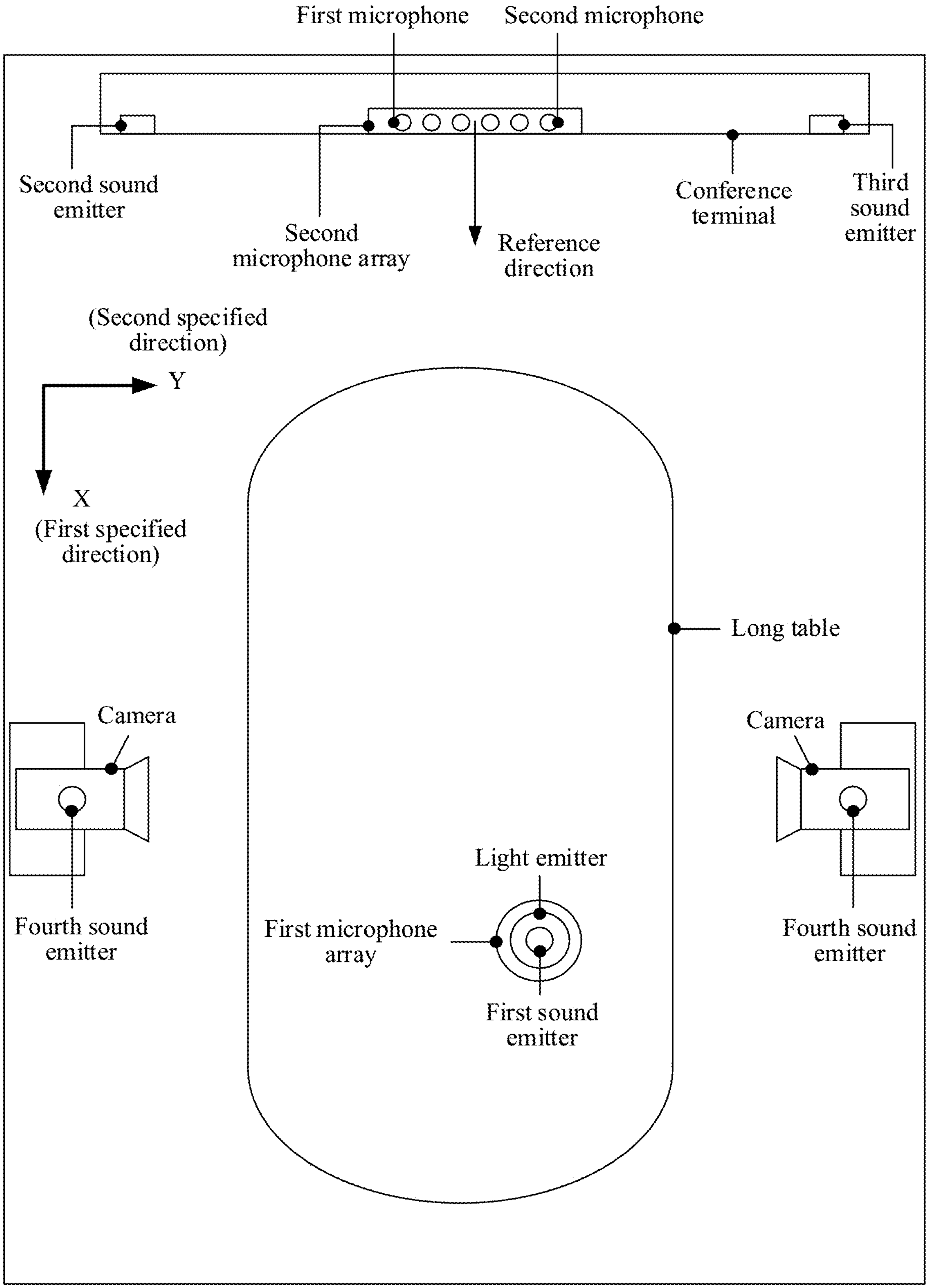
FIG. 12 is a schematic diagram of a tracking control system according to an embodiment of this application.

Case 2: As shown in FIG. 12, an architecture of a tracking control system is similar to that in Case 1, and a difference lies in that the camera may not be integrated with the third microphone array, and the first microphone array may be integrated with a light emitter in addition to the first sound emitter. There may be a variety of possibilities for the light emitter, for example, a common LED light source or an infrared LED light source.

The control device may prerecord a location of the second microphone array, a deviation angle of the second microphone array, a location of a first microphone in the second microphone array, a location of a second microphone in the second microphone array, a location of the second sound emitter, and a location of the third sound emitter, and prerecord a first specified direction corresponding to the first microphone array and a second specified direction corresponding to the camera. For example, the control device establishes a plane rectangular coordinate system in a horizontal plane by using a location of the second microphone array as an origin of coordinates and using a reference direction of the second microphone array as an X-axis positive direction. The first microphone and the second microphone in the second microphone array may be symmetrically disposed on the conference terminal relative to the central location. When the distance between the first microphone and the second microphone is D, location coordinates of the first microphone in the second microphone array may be recorded as (0, −D/2), and location coordinates of the second microphone in the second microphone array may be recorded as (0, D/2). Similarly, the second sound emitter and the third sound emitter are usually symmetrically disposed on the conference terminal relative to the central location. When a distance between the second sound emitter and the third sound emitter is L, location coordinates of the second sound emitter may be recorded as (0, −L/2), and location coordinates of the third sound emitter may be recorded as (0, L/2). In addition, a first specified direction corresponding to the first microphone array may be set and recorded as an X-axis positive direction, and a second specified direction corresponding to the camera may be a Y-axis positive direction.

Based on the foregoing tracking control system, the following separately describes a process of calibrating the location of the first microphone array, the deviation angle of the first microphone array, the location of the camera, and the deviation angle of the camera.

Calibration of the location of the first microphone array, calibration of the deviation angle of the first microphone array, and calibration of the location of the camera in Case 2 are similar to the corresponding processing in Case 1. For details, refer to the description of the corresponding processing in Case 1. Details are not described herein again. Calibration of the deviation angle of the camera in Case 2 is different from that in Case 1. Details are as follows:

Calibration of the Deviation Angle of the Camera (if there are a Plurality of Cameras, a Deviation Angle of Each Camera May be Calibrated in the Following Processing Manner):

The deviation angle of the camera is an angle of a reference direction of the camera relative to the second specified direction, and the second specified direction may be a Y-axis positive direction.

The control device controls the light emitter to emit light, determines a location of a light emitting point in an image shot by the camera, determines an azimuth $\theta_9$ of the light emitter relative to the camera based on the location of the light emitting point in the image, controls the fourth sound emitter to emit a sound signal $S_6$, and determines an azimuth $\theta_7$ of the fourth sound emitter relative to the first microphone array based on detection data of the first microphone array. The control device determines a deviation angle $\theta_8$ of the camera based on the azimuth $\theta_9$, the azimuth $\theta_7$, and an included angle $\theta_5$ between a reference direction of the first microphone array and the first specified direction.

An equivalent center of the light emitter may be the same as an equivalent center of the first microphone array. That is, a location of the light emitter may be the same as the location of the first microphone array. An equivalent center of the fourth sound emitter may be the same as an equivalent center of the camera. That is, a location of the fourth sound emitter may be the same as the location of the camera.

Figure 13:
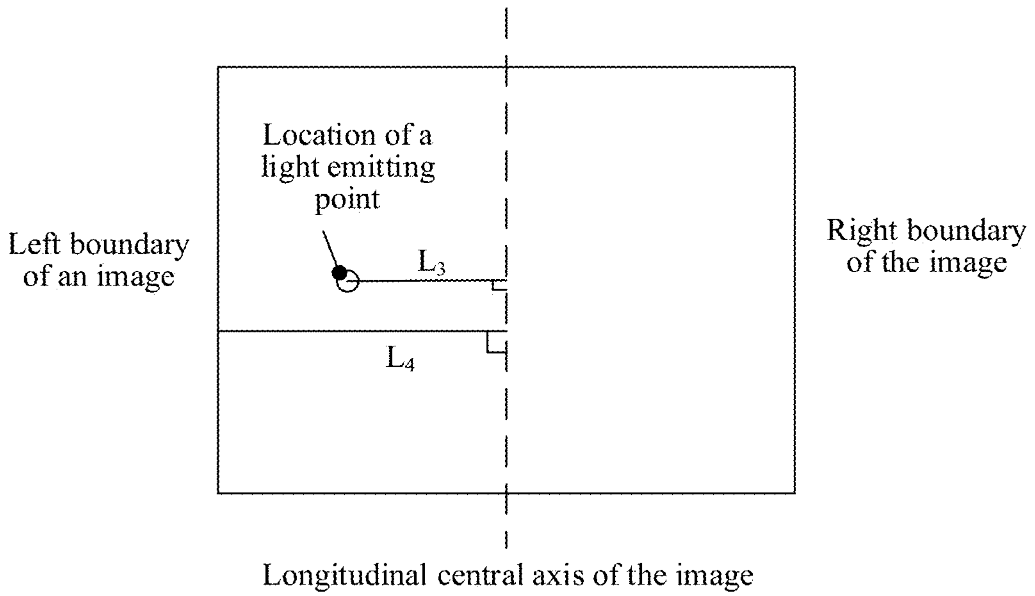
FIG. 13 is a schematic diagram of processing according to an embodiment of this application.
Figure 14:
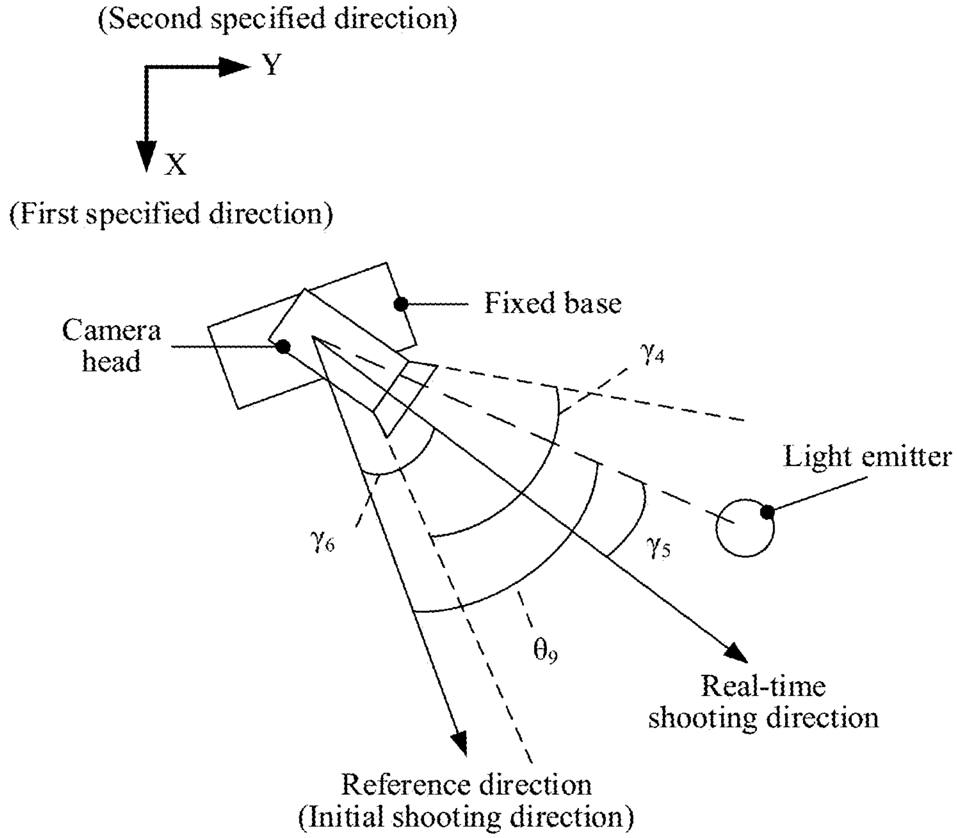
FIG. 14 is a schematic diagram of processing according to an embodiment of this application.

During implementation, the control device may record a correspondence between a focal length of the camera and a horizontal shooting angle range (or referred to as a horizontal angle of view). The correspondence may be reported by the camera to the control device, or may be manually recorded into the control device, or the like. The control device may determine a current focal length of the camera. Then, a horizontal shooting angle range $\gamma_4$ corresponding to the current focal length is searched in the foregoing correspondence table. After controlling the light emitter to emit light, the controller may obtain an image shot by the camera, and determine, in the image, a distance $L_3$ between a location of the light emitting point and a longitudinal central axis of the image. The control device may record a distance $L_4$ between a left or right boundary of the image and the longitudinal central axis of the image. A real-time shooting direction of a camera head corresponds to the longitudinal central axis of the image. An azimuth $\gamma_5$ of the light emitter relative to the camera head may be determined based on the horizontal shooting angle $\gamma_4$, the distance $L_3$, and the distance $L_4$. The azimuth $\gamma_5$ is an anticlockwise included angle from the real-time shooting direction of the camera head to a line connecting the light emitter and the camera head. Refer to FIG. 13 and FIG. 14. A calculation process may be as follows:

$$\gamma_5 = \frac{L_3}{2 \cdot L_4} \cdot \gamma_4$$

In this case, the control device may further obtain a current rotation angle $\gamma_6$ of the camera. The azimuth $\theta_9$ of the light emitter relative to the camera may be obtained through calculation based on the azimuth $\gamma_5$ and the rotation angle $\gamma_6$. Refer to FIG. 14. A calculation process may be as follows:

$$\theta_9 = \gamma_6 + \gamma_5$$

The rotation angle $\gamma_6$ is a rotation angle of the camera head of the camera relative to a fixed base. Generally, the camera head rotates under control of the control device. Therefore, the control device learns of the rotation angle $\gamma_6$.

It should be noted that there are a plurality of possible location relationships between the light emitter, the camera head, and the fixed base. In the foregoing description process, only one of the location relationships is used as an example for description. For another possible location relationship, the azimuth $\theta_9$ may be obtained through a geometric operation based on the foregoing related data. The location relationship and the calculation method used in the foregoing description process do not constitute a limitation on this embodiment.

The control device may control the fourth sound emitter to emit a sound signal $S_6$. When the fourth sound emitter emits the sound signal $S_6$, each microphone in the first microphone array may detect corresponding audio data, and the first microphone array may send the audio data to the control device. The control device may perform sound source localization based on the audio data, and determine the azimuth $\theta_7$ of the fourth sound emitter relative to the first microphone array.

Figure 15:
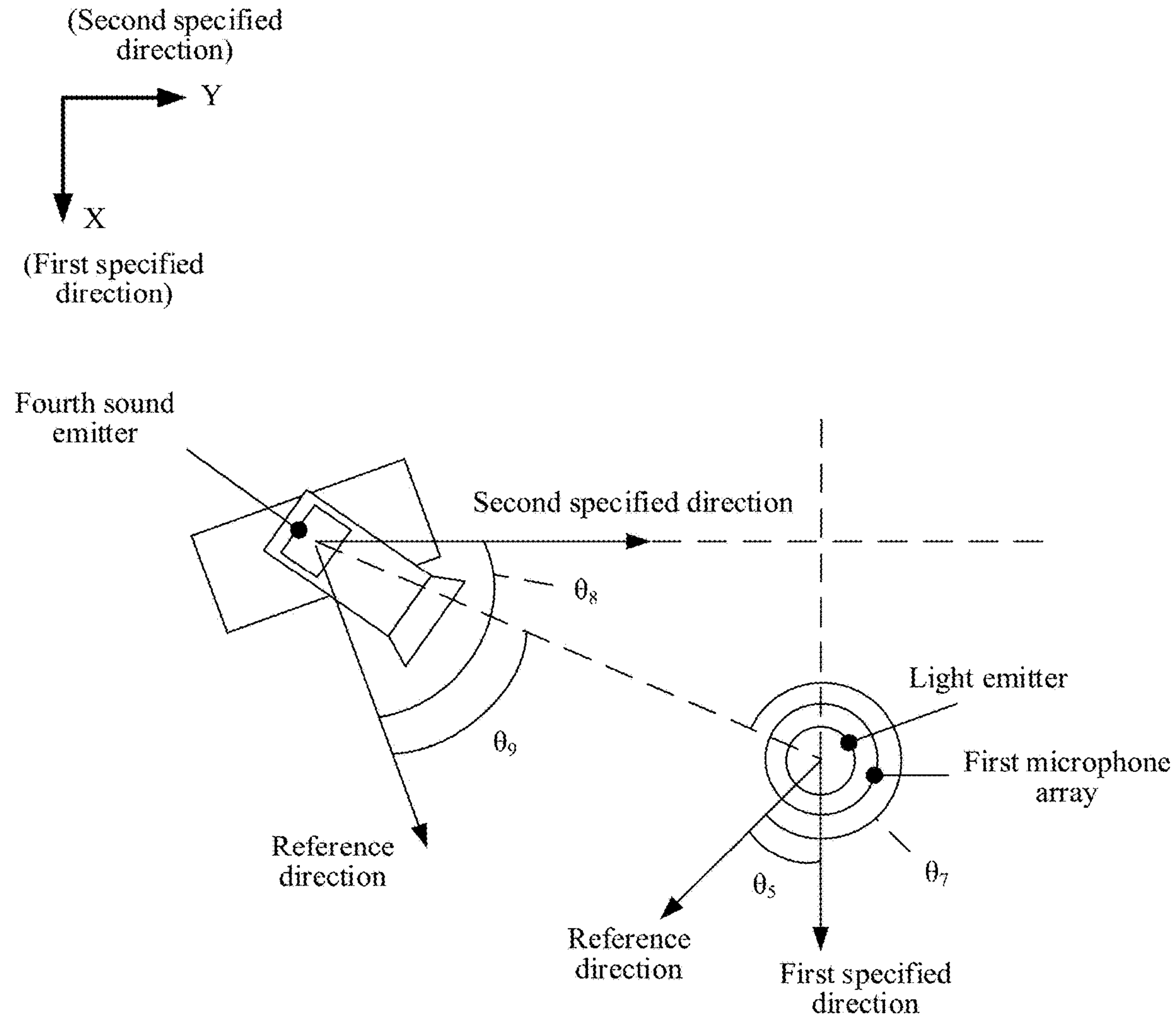
FIG. 15 is a schematic diagram of processing according to an embodiment of this application.

The control device may obtain the deviation angle $\theta_8$ of the camera through calculation based on the azimuth $\theta_9$, the azimuth $\theta_7$, the deviation angle $\theta_5$ of the first microphone array, and a geometric relationship between the first microphone array, the camera, and the fourth sound emitter. Refer to FIG. 15. A calculation process may be as follows:

$$\theta_8 = \theta_9 - \theta_7 + \theta_5 + \frac{3}{2}\pi$$

A value of the calculated $\theta_8$ may be adjusted to a range of 0 to $2\pi$. For example, if $\theta_8$ is 560°, $\theta_8$ may be adjusted to 200° (that is, 560°–360°).

It should be noted that there are a plurality of possible location relationships between the first microphone array, the camera, and the fourth sound emitter. The foregoing description process is described by using only one of the location relationships as an example. For another possible location relationship, the deviation angle of the camera may be obtained through a geometric operation based on the foregoing related data. The location relationship and the calculation method used in the foregoing description process do not constitute a limitation on this embodiment.

Figure 16:
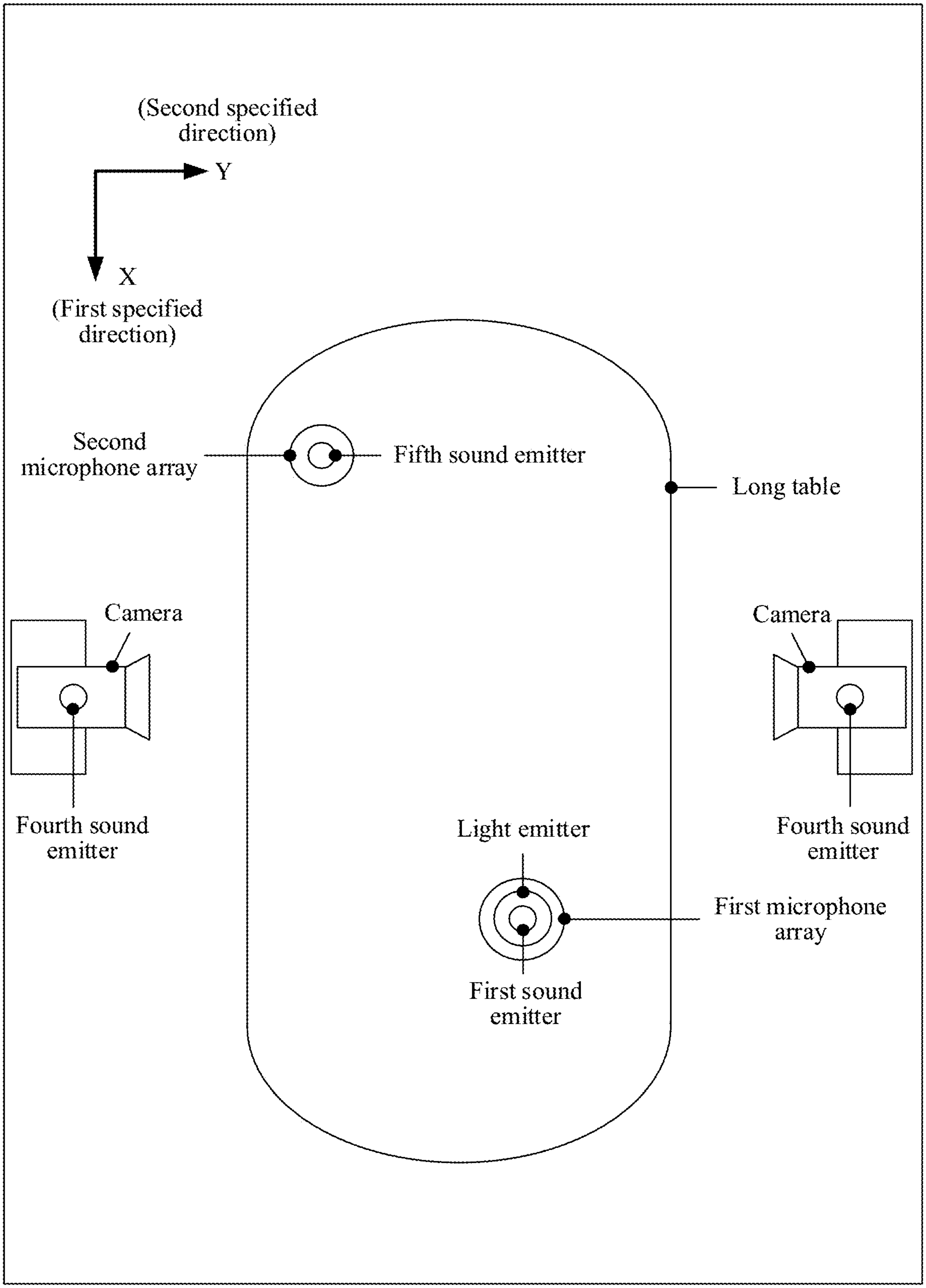
FIG. 16 is a schematic diagram of a tracking control system according to an embodiment of this application.

Case 3: As shown in FIG. 16, the tracking control system may include a first microphone array, a second microphone array, and a camera. Both the first microphone array and the second microphone array are distributed microphone arrays, the first microphone array may be integrated with a first sound emitter and a light emitter, and the second microphone array may be integrated with a fifth sound emitter. There may be one or more first microphone arrays. The camera may be a distributed camera, and may be integrated with a fourth sound emitter. There may be one or more cameras. There may be a variety of possibilities for a sound emitter, for example, a common loudspeaker or an ultrasonic transmitter. There may be a variety of possibilities for the light emitter, for example, a common LED light source or an infrared LED light source. The tracking control system may further include a conference terminal, and the control device may be integrated in the conference terminal, or may be integrated in another device, or may be an additional independent terminal device.

In a conference room, the foregoing devices may be disposed in any location. For example, in a conference room with a long table, the first microphone array and the second microphone array may be disposed on the long table, and two cameras may be suspended on walls on two sides of the long table.

The control device may prerecord a location of the second microphone array and a deviation angle of the second microphone array, and prerecord a first specified direction corresponding to the first microphone array and a second specified direction corresponding to the camera. For example, the control device establishes a plane rectangular coordinate system in a horizontal plane by using the location of the second microphone array as an origin of coordinates and using a reference direction of the second microphone array as an X-axis positive direction. In addition, the first specified direction corresponding to the first microphone array may be set and recorded as an X-axis positive direction, and the second specified direction corresponding to the camera may be a Y-axis positive direction.

Based on the foregoing tracking control system, the following separately describes a process of calibrating a location of the first microphone array, a deviation angle of the first microphone array, a location of the camera, and a deviation angle of the camera.

(1) Calibration of the Location of the First Microphone Array (if there are a Plurality of First Microphone Arrays, a Location of Each First Microphone Array May be Calibrated in the Following Processing Manner):

The control device controls the first sound emitter to emit a sound signal $S_7$, determines a distance $D_5$ between the second microphone array and the first sound emitter based on a time point at which the first sound emitter emits the sound signal $S_7$ and a time point at which the second microphone array detects the sound signal $S_7$, and determines an azimuth $\theta_{10}$ of the first sound emitter relative to the second microphone array based on detection data of the second microphone array. The control device determines locations of the first sound emitter and the first microphone array based on the distance $D_5$, the azimuth $\theta_{10}$, and the location of the second microphone array.

Equivalent centers of the first sound emitter and the first microphone array may be the same. That is, a location of the first sound emitter and the location of the first microphone array may be the same.

During implementation, when controlling the first sound emitter to emit the sound signal $S_7$, the control device may record the time point $t_7$ at which the first sound emitter emits the sound signal $S_7$. A microphone in the second microphone array may detect corresponding audio data, and record a detection time point $t_8$ corresponding to the audio data, that is, a time point at which the audio data is detected. The control device may obtain the time point $t_7$ at which the second microphone array detects the sound signal $S_7$ and the time point $t_8$ at which the second microphone array detects the sound signal $S_7$, and then may obtain, through calculation, duration $\Delta T_5$ between the time point $t_7$ and the time point $t_8$. Further, the control device may obtain, through calculation, the distance $D_5$ between the second microphone array and the first sound emitter based on prestored sound speed data V.

In addition, the second microphone array may send the audio data corresponding to the sound signal $S_7$ to the control device. The control device may perform sound source localization based on the audio data, and determine the azimuth $\theta_{10}$ of the first sound emitter relative to the second microphone array.

Figure 17:
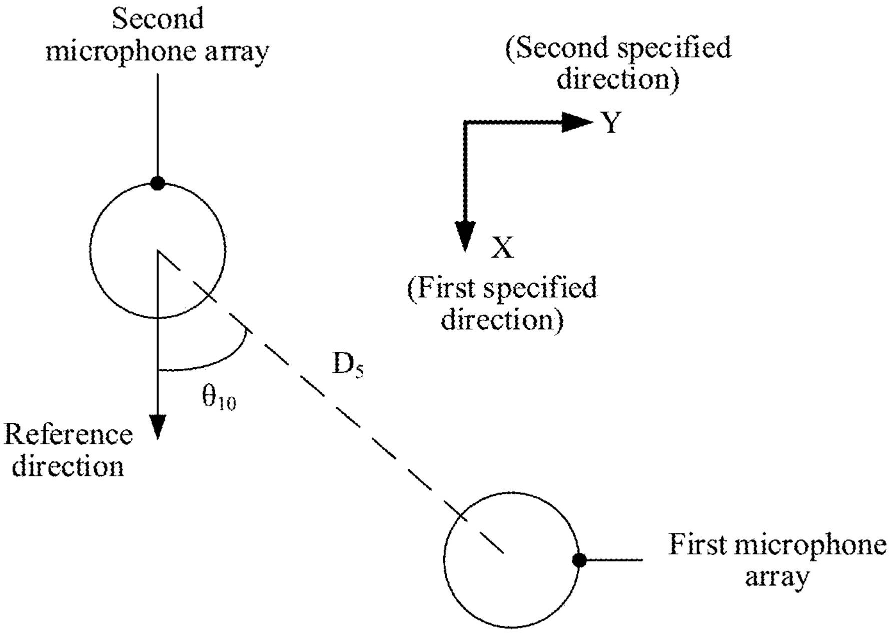
FIG. 17 is a schematic diagram of processing according to an embodiment of this application.

The control device may obtain the location of the first sound emitter through calculation based on the distance $D_5$, the azimuth $\theta_{10}$, the location of the second microphone array, and a geometric relationship between the first sound emitter and the second microphone array. Coordinates of the first sound emitter are represented as $(x,y)$. Refer to FIG. 17. A calculation process may be as follows:

$$x_1 = D_5 \cdot \sin\theta_{10}$$

$$y_1 = D_5 \cdot \cos\theta_{10}$$

It should be noted that there are a plurality of possible location relationships between the first sound emitter and the second microphone. The foregoing description process is described by using only one of the location relationships as an example. For another possible location relationship, the location of the first sound emitter may be obtained through a geometric operation based on the foregoing related data. The location relationship and the calculation method used in the foregoing description process do not constitute a limitation on this embodiment.

(2) Calibration of the Deviation Angle of the First Microphone Array (if there are a Plurality of First Microphone Arrays, a Deviation Angle of Each First Microphone Array May be Calibrated in the Following Processing Manner):

The control device controls the first sound emitter to emit a sound signal $S_7$, determines an azimuth $\theta_{10}$ of the first sound emitter relative to the second microphone array based on detection data of the second microphone array, controls the fifth sound emitter to emit a sound signal $S_8$, and determines an azimuth $\theta_{11}$ of the fifth sound emitter relative to the first microphone array based on detection data of the first microphone array. The control device determines the deviation angle $\theta_5$ of the first microphone array based on the azimuth $\theta_{10}$, the azimuth $\theta_{11}$, and an included angle $\theta_{12}$ between the reference direction of the second microphone array and the first specified direction.

During implementation, when the first sound emitter emits the sound signal $S_7$, a microphone in the second microphone array may detect corresponding audio data, and the second microphone array may send the audio data to the control device. The control device may perform sound source localization based on the audio data, and determine the azimuth $\theta_{10}$ of the first sound emitter relative to the second microphone array. Similarly, when the fifth sound emitter makes a sound, the control device may also perform sound source localization based on audio data detected by a microphone in the first microphone array, and determine the azimuth $\theta_{11}$ of the fifth sound emitter relative to the first microphone array.

Figure 18:
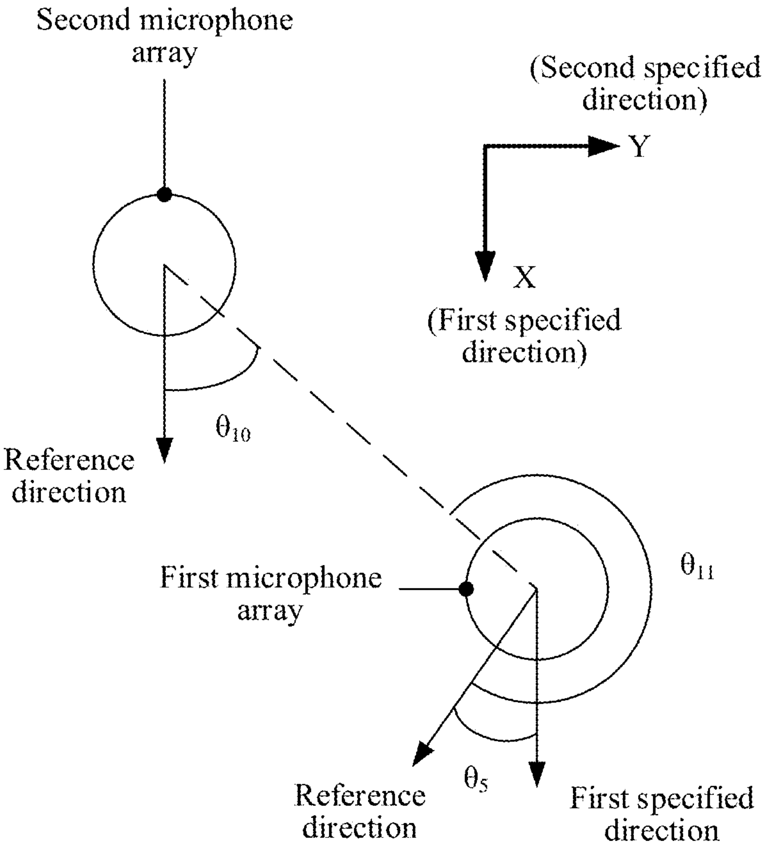
FIG. 18 is a schematic diagram of processing according to an embodiment of this application.

When $\theta_{12}$ is 0 degrees, the control device may determine the deviation angle $\theta_5$ of the first microphone array based on the azimuth $\theta_{10}$, the azimuth $\theta_{11}$, and a geometric relationship between the second microphone array and the first microphone array. Refer to FIG. 18. A calculation process may be as follows:

$$\theta_5 = \theta_{11} - \theta_{10} - \pi$$

Figure 19:
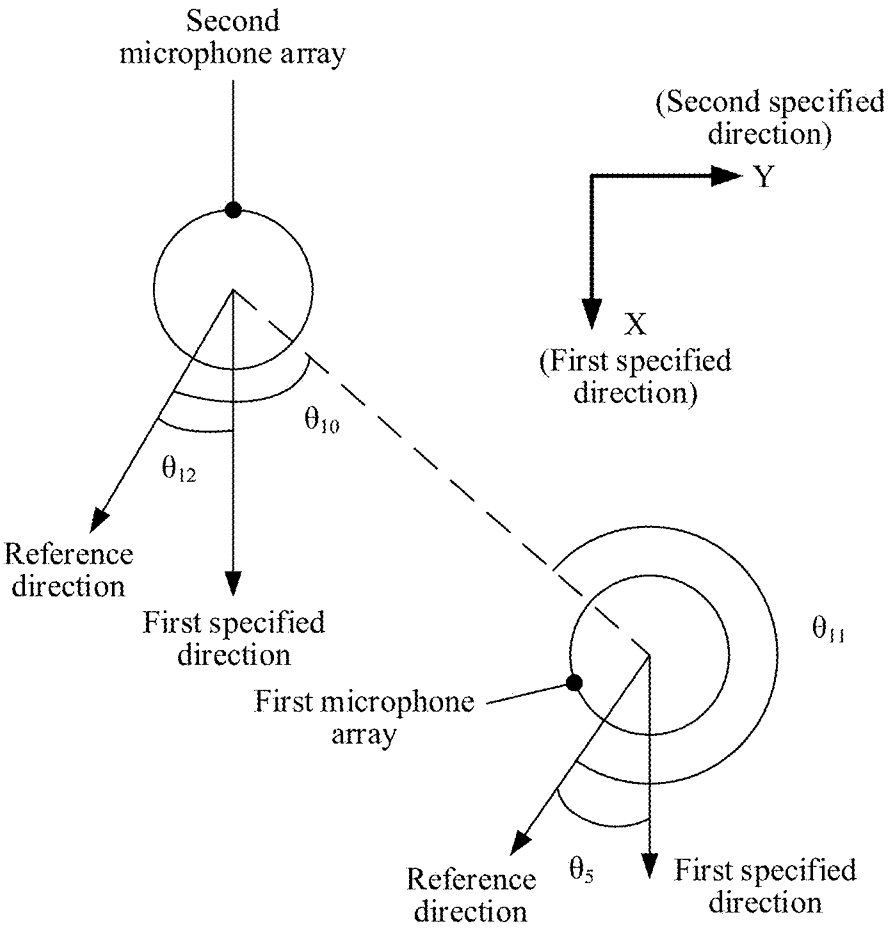
FIG. 19 is a schematic diagram of processing according to an embodiment of this application.

When $\theta_{12}$ is not 0 degrees, the control device may determine the deviation angle $\theta_5$ of the first microphone array based on the azimuth $\theta_{10}$, the azimuth $\theta_{11}$, the included angle $\theta_{12}$, and the geometric relationship between the second microphone array and the first microphone array. Refer to FIG. 19. A calculation process may be as follows:

$$\theta_5 = \theta_{12} + \theta_{11} - \theta_{10} - \pi$$

It should be noted that there are a plurality of possible location relationships between the first microphone array and the second microphone array. The foregoing description process is described by using only one of the location relationships as an example. For another possible location relationship, the deviation angle of the first microphone array may be obtained through a geometric operation based on the foregoing related data. The location relationship and the calculation method used in the foregoing description process do not constitute a limitation on this embodiment.

(3) Calibration of the Location of the Camera (if there are a Plurality of Cameras, a Location of Each Camera May be Calibrated in the Following Processing Manner)

The control device controls the fourth sound emitter to emit a sound signal $S_9$, determines a distance $D_6$ between the first microphone array and the fourth sound emitter and a distance $D_7$ between the second microphone array and the fourth sound emitter based on a time point at which the fourth sound emitter emits the sound signal $S_9$ and a time point at which the first microphone array and the second microphone array detect the sound signal $S_9$, and determines locations of the fourth sound emitter and the camera based on the location of the first microphone array, the location of the second microphone array, the distance $D_6$, and the distance $D_7$.

Equivalent centers of the fourth sound emitter and the camera may be the same. That is, a location of the fourth sound emitter may be the same as the location of the camera.

During implementation, when controlling the fourth sound emitter to emit the sound signal $S_9$, the control device may record the time point $t_9$ at which the fourth sound emitter emits the sound signal $S_9$. The first microphone array and the second microphone array may detect corresponding audio data, and record a detection time point corresponding to the audio data, that is, a time point at which the audio data is detected. The control device may obtain a time point $t_{10}$ at which the first microphone array detects the sound signal $S_9$ and a time point $t_{11}$ at which the second microphone array detects the sound signal $S_9$, and then may obtain, through calculation, duration $\Delta T_6$ between the time point to and the time point $t_{10}$ and duration $\Delta T_7$ between the time point $t_9$ and the time point $t_{11}$. Further, the control device may obtain the distance $D_6$ between the first microphone array and the fourth sound emitter and the distance $D_7$ between the second microphone array and the fourth sound emitter through calculation based on prestored sound speed data V.

Based on the locations of the first microphone array and the second microphone array, it may be determined that a distance between the first microphone array and the second microphone array is $D_8$. Then, the control device may obtain the location of the fourth sound emitter through calculation based on the distance $D_6$, the distance $D_7$, and the distance $D_8$, and a geometric relationship between the first microphone array, the second microphone array, and the fourth sound emitter. A calculation process of determining the location of the fourth sound emitter is similar to the process of determining the location of the first sound emitter in Case 1, and reference may be made to related description of calibration of the location of the first microphone array in Case 1.

(4) Calibration of the Deviation Angle of the Camera (if there are a Plurality of Cameras, a Deviation Angle of Each Camera May be Calibrated in the Following Processing Manner):

Corresponding processing of calibration of the deviation angle of the camera in Case 3 is similar to that in Case 2. For details, refer to the description of calibration of the deviation angle of the camera in Case 2. Details are not described herein again.

Figure 20:
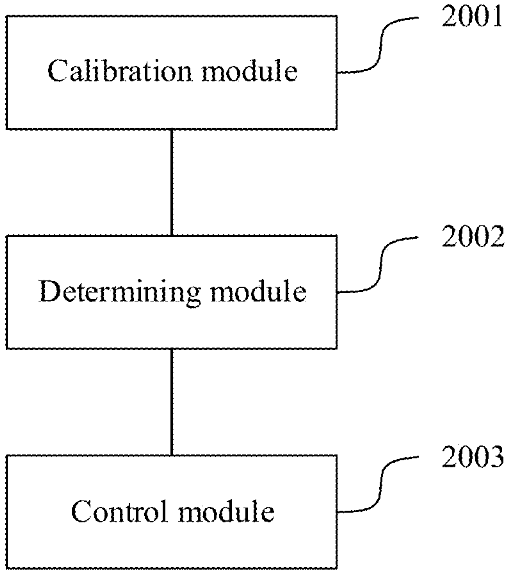
FIG. 20 is a schematic diagram of a tracking control apparatus according to an embodiment of this application.

Based on a same technical concept, embodiments of this application further provide a tracking control apparatus. The apparatus may be used in a control device in the tracking control system in the foregoing embodiments. The tracking control system includes a first microphone array, a second microphone array, a camera, and a control device. As shown in FIG. 20, the apparatus includes:

- a calibration module 2001, configured to: determine a location of the first microphone array and a location of the camera, and specifically implement a calibration function in step 401 and another implicit step;
- a determining module 2002, configured to: when a sound source object makes a sound, determine a location of the sound source object based on a location of the sound source object relative to the first microphone array, a location of the sound source object relative to the second microphone array, the location of the first microphone array, and a location of the second microphone array, and specifically implement a determining function in step 402 and another implicit step; and
- a control module 2003, configured to: determine a tracking operation on the camera based on the location of the sound source object and the location of the camera, and specifically implement a control function in step 403 and another implicit step.

In a possible implementation, the first microphone array is integrated with a first sound emitter, and the second microphone array includes a first microphone and a second microphone. The calibration module 2001 is configured to: determine a distance $D_1$ between the first sound emitter and the first microphone and a distance $D_2$ between the first sound emitter and the second microphone based on time at which the first microphone and the second microphone receive a sound signal from the first sound emitter and time at which the first sound emitter emits the sound signal; and determine a location of the first microphone array relative to the second microphone array based on a location of the first microphone, a location of the second microphone, the distance $D_1$, and the distance $D_2$.

In a possible implementation, the tracking control system further includes a second sound emitter and a third sound emitter, and the second sound emitter and the third sound emitter are integrated on a same electronic screen as the second microphone array. The calibration module 2001 is further configured to: obtain an azimuth $\theta_3$ of the second sound emitter relative to the first microphone array and an azimuth $\theta_4$ of the third sound emitter relative to the first microphone array that are sent by the first microphone array; and determine an orientation of the first microphone array based on the azimuth $\theta_3$, the azimuth $\theta_4$, a location of the second sound emitter, and a location of the third sound emitter.

In a possible implementation, the camera is integrated with a fourth sound emitter, and the second microphone array includes a first microphone and a second microphone. The calibration module 2001 is configured to: determine a distance $D_3$ between the first microphone and the fourth sound emitter and a distance $D_4$ between the second microphone and the fourth sound emitter based on time at which the first microphone and the second microphone receive a sound signal from the fourth sound emitter and time at which the fourth sound emitter emits the sound signal; and determine a location of the camera relative to the second microphone array based on a location of the first microphone, a location of the second microphone, the distance $D_3$, and the distance $D_4$.

In a possible implementation, the first microphone array is integrated with a first sound emitter, and the camera is integrated with a fourth sound emitter and a third microphone array. The calibration module 2001 is configured to: determine an azimuth $\theta_6$ of the first sound emitter relative to the third microphone array based on data detected by the third microphone array when the first sound emitter emits a sound signal, and determine an azimuth $\theta_7$ of the fourth sound emitter relative to the first microphone array based on data detected by the first microphone array when the fourth sound emitter emits a sound signal; and determine a deviation angle of the camera based on the azimuth $\theta_6$, the azimuth $\theta_7$, and the orientation of the first microphone array.

In a possible implementation, the first microphone array is integrated with a light emitter, and the camera is integrated with a fourth sound emitter. The calibration module 2001 is configured to: determine a location of a light emitting point in an image shot by the camera, where the image is shot when the light emitter emits light; determine an azimuth $\theta_9$ of the light emitter relative to the camera based on the location of the light emitting point in the image and a rotation angle of the camera; determine an azimuth $\theta_7$ of the fourth sound emitter relative to the first microphone array based on data detected by the first microphone array when the fourth sound emitter emits a sound signal; and determine an orientation of the camera based on the azimuth $\theta_9$, the azimuth $\theta_7$, and the orientation of the first microphone array.

In a possible implementation, the first microphone array is integrated with a first sound emitter, the second microphone array includes a first microphone and a second microphone. The calibration module 2001 is configured to: determine a distance $D_5$ between the first sound emitter and the second microphone array and an azimuth $\theta_{10}$ of the first sound emitter relative to the second microphone array based on data detected by the second microphone array when the first sound emitter emits a sound signal; and determine the location of the first microphone array based on the distance $D_5$, the azimuth $\theta_{10}$, and the location of the second microphone array.

In a possible implementation, the first microphone array is integrated with a first sound emitter, and the second microphone array is integrated with a fifth sound emitter. The calibration module 2001 is configured to: determine an azimuth $\theta_{10}$ of the first sound emitter relative to the second microphone array based on data detected by the second microphone array when the first sound emitter emits a sound signal, and determine an azimuth $\theta_{11}$ of the fifth sound emitter relative to the first microphone array based on data detected by the first microphone array when the fifth sound emitter emits a sound signal; and determine an orientation of the first microphone array based on the azimuth $\theta_{10}$, the azimuth $\theta_{11}$, and an orientation of the second microphone array.

In a possible implementation, the camera is integrated with a fourth sound emitter. The calibration module 2001 is further configured to: determine a distance $D_6$ between the first microphone array and the fourth sound emitter and a distance $D_7$ between the second microphone array and the fourth sound emitter based on time at which the first microphone array and the second microphone array receive a sound signal from the fourth sound emitter and time at which the fourth sound emitter emits the sound signal; and determine the location of the camera based on the location of the first microphone array, the location of the second microphone array, the distance $D_6$, and the distance $D_7$.

In a possible implementation, the control module 2003 is configured to: determine an azimuth of the sound source object relative to the camera and a distance between the sound source object and the camera based on the location of the sound source object and the location of the camera; and determine a tracking rotation angle of the camera based on the azimuth of the sound source object relative to the camera, and determines a tracking focal length of the camera based on the distance between the sound source object and the camera.

In a possible implementation, the tracking control system further includes another camera. The control module 2003 is configured to: determine, based on the location of the sound source object and locations of the two cameras, a target camera that is in the two cameras and that is farther away from the sound source object, and determine a tracking operation on the target camera based on the location of the sound source object and the location of the target camera.

It should be noted that the calibration module 2001, the determining module 2002, and the control module 2003 may be implemented by a processor, or may be implemented by a processor in cooperation with a memory and a transceiver.

It should be noted that when the tracking control apparatus provided in the foregoing embodiment performs the tracking control processing, division into the foregoing functional modules is merely used as an example for description. In actual application, the foregoing functions may be allocated to different functional modules for implementation according to a requirement. That is, an internal structure of the apparatus is divided into different functional modules, to implement all or some of the functions described above. In addition, the tracking control apparatus provided in the foregoing embodiment and the tracking control method embodiment belong to a same concept. For a specific implementation process, refer to the method embodiment, and details are not described herein again.

In the foregoing embodiment, all or a part of the software, hardware, firmware, or any combination thereof may be implemented. When the software is used for implementation, all or a part of the implementation may be implemented in a form of a computer program product. The computer program product includes one or more computer instructions. When the computer program instructions are loaded and executed on a device, all or some of the procedures or functions are generated according to embodiments of this application. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a device, or a data storage device, such as a server or a data center, integrating one or more usable media.

The usable medium may be a magnetic medium (for example, a floppy disk, a hard disk drive, or a magnetic tape), an optical medium (for example, a digital video disk (DVD)), or a semiconductor medium (for example, a solid-state drive).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing description is merely an embodiment of this application, but is not intended to limit this application. Any modification, equivalent replacement, or improvement made without departing from the principle of this application shall fall within the protection scope of this application.

What is claimed is:

1. A tracking control method, wherein the method is applied to a tracking control system, the tracking control system comprises a first microphone array, a second microphone array, a camera, and a control device, and the method comprises:

determining, by the control device, a location of the first microphone array and a location of the camera;

based on a sound source object making a sound, determining, by the control device, a location of the sound source object based on a location of the sound source object relative to the first microphone array, a location of the sound source object relative to the second microphone array, the location of the first microphone array, and a location of the second microphone array; and determining, by the control device, a tracking operation on the camera based on the location of the sound source object and the location of the camera.

2. The method according to claim 1, wherein the first microphone array is integrated with a first sound emitter, the second microphone array comprises a first microphone and a second microphone, and the determining the location of the first microphone array comprises:

determining, by the control device, a distance $D_1$ between the first sound emitter and the first microphone and a distance $D_2$ between the first sound emitter and the second microphone based on a time at which the first microphone and the second microphone receive a sound signal from the first sound emitter and a time at which the first sound emitter emits the sound signal; and determining, by the control device, a location of the first microphone array relative to the second microphone array based on a location of the first microphone, a location of the second microphone, the distance $D_1$, and the distance $D_2$.

3. The method according to claim 1, wherein the tracking control system further comprises a second sound emitter and a third sound emitter, the second sound emitter and the third sound emitter are integrated on a same electronic screen as the second microphone array, and the determining the location of the first microphone array further comprises:

obtaining, by the control device, an azimuth $\theta_3$ of the second sound emitter relative to the first microphone array and an azimuth $\theta_4$ of the third sound emitter relative to the first microphone array that are sent by the first microphone array; and determining, by the control device, an orientation of the first microphone array based on the azimuth $\theta_3$, the azimuth $\theta_4$, a location of the second sound emitter, and a location of the third sound emitter.

4. The method according to claim 1, wherein the camera is integrated with a fourth sound emitter, the second microphone array comprises a first microphone and a second microphone, and the determining the location of the camera comprises:

determining, by the control device, a distance $D_3$ between the first microphone and the fourth sound emitter and a distance $D_4$ between the second microphone and the fourth sound emitter based on a time at which the first microphone and the second microphone receive a sound signal from the fourth sound emitter and a time at which the fourth sound emitter emits the sound signal; and determining, by the control device, a location of the camera relative to the second microphone array based on a location of the first microphone, a location of the second microphone, the distance $D_3$, and the distance $D_4$.

5. The method according to claim 3, wherein the first microphone array is integrated with a first sound emitter, the camera is integrated with a fourth sound emitter and a third microphone array, and the determining the location of the camera comprises:

determining, by the control device, an azimuth $\theta_6$ of the first sound emitter relative to the third microphone array based on data detected by the third microphone array when the first sound emitter emits a sound signal, and determining an azimuth $\theta_7$ of the fourth sound emitter relative to the first microphone array based on data detected by the first microphone array when the fourth sound emitter emits a sound signal; and determining, by the control device, a deviation angle of the camera based on the azimuth $\theta_6$, the azimuth $\theta_7$, and the orientation of the first microphone array.

6. The method according to claim 3, wherein the first microphone array is integrated with a light emitter, the camera is integrated with a fourth sound emitter, and the determining the location of the camera comprises:

determining, by the control device, a location of a light emitting point in an image shot by the camera, wherein the image is shot when the light emitter emits light, and determining an azimuth $\theta_9$ of the light emitter relative to the camera based on the location of the light emitting point in the image and a rotation angle of the camera;

determining, by the control device, an azimuth $\theta_7$ of the fourth sound emitter relative to the first microphone array based on data detected by the first microphone array when the fourth sound emitter emits a sound signal; and determining, by the control device, an orientation of the camera based on the azimuth $\theta_9$, the azimuth $\theta_7$, and the orientation of the first microphone array.

7. The method according to claim 1, wherein the first microphone array is integrated with a first sound emitter, the second microphone array comprises a first microphone and a second microphone, and the determining a location of the first microphone array comprises:

determining, by the control device, a distance $D_5$ between the first sound emitter and the second microphone array and an azimuth $\theta_{10}$ of the first sound emitter relative to the second microphone array based on data detected by the second microphone array when the first sound emitter emits a sound signal; and determining, by the control device, the location of the first microphone array based on the distance $D_5$, the azimuth $\theta_{10}$, and the location of the second microphone array.

8. The method according to claim 1, wherein the first microphone array is integrated with a first sound emitter, the second microphone array is integrated with a fifth sound emitter, and the determining the location of the first microphone array comprises:

determining, by the control device, an azimuth $\theta_{10}$ of the first sound emitter relative to the second microphone array based on data detected by the second microphone array when the first sound emitter emits a sound signal, and determining an azimuth $\theta_{11}$ of the fifth sound emitter relative to the first microphone array based on data detected by the first microphone array when the fifth sound emitter emits a sound signal; and determining, by the control device, an orientation of the first microphone array based on the azimuth $\theta_{10}$, the azimuth $\theta_{11}$, and an orientation of the second microphone array.

9. The method according to claim 1, wherein the camera is integrated with a fourth sound emitter, and the method further comprises:

determining, by the control device, a distance $D_6$ between the first microphone array and the fourth sound emitter and a distance $D_7$ between the second microphone array and the fourth sound emitter based on a time at which the first microphone array and the second microphone array receive a sound signal from the fourth sound emitter and a time at which the fourth sound emitter emits the sound signal; and determining, by the control device, the location of the camera based on the location of the first microphone array, the location of the second microphone array, the distance $D_6$, and the distance $D_7$.

10. The method according to claim 1, wherein the determining, by the control device, the tracking operation on the camera based on the location of the sound source object and the location of the camera comprises:

determining, by the control device, an azimuth of the sound source object relative to the camera and a distance between the sound source object and the camera based on the location of the sound source object and the location of the camera; and determining, by the control device, a tracking rotation angle of the camera based on the azimuth of the sound source object relative to the camera, and determining a tracking focal length of the camera based on the distance between the sound source object and the camera.

11. The method according to claim 1, wherein the tracking control system further comprises another camera, and the determining, by the control device, the tracking operation on the camera based on the location of the sound source object and the location of the camera comprises:

determining, by the control device based on the location of the sound source object and locations of the camera and the another camera, a target camera that is among the camera and the another camera and that is farther away from the sound source object, and determining a tracking operation on the target camera based on the location of the sound source object and the location of the target camera.

12. A computing device, wherein the computing device is applied to a tracking control system, the tracking control system comprises a first microphone array, a second microphone array, a camera, and a control device, wherein the computing device comprises a memory and a processor, the memory is configured to store computer instructions, and the processor is configured to execute the computer instructions stored in the memory, so that the computer device performs operations comprising:

determine a location of the first microphone array and a location of the camera;

based on a sound source object making a sound, determining a location of the sound source object based on a location of the sound source object relative to the first microphone array, a location of the sound source object relative to the second microphone array, the location of the first microphone array, and a location of the second microphone array; and determining a tracking operation on the camera based on the location of the sound source object and the location of the camera.

13. The computing device according to claim 12, wherein the first microphone array is integrated with a first sound emitter, the second microphone array comprises a first microphone and a second microphone, and the determining the location of the first microphone array comprises:

determining a distance $D_1$ between the first sound emitter and the first microphone and a distance $D_2$ between the first sound emitter and the second microphone based on a time at which the first microphone and the second microphone receive a sound signal from the first sound emitter and a time at which the first sound emitter emits the sound signal; and determining a location of the first microphone array relative to the second microphone array based on a location of the first microphone, a location of the second microphone, the distance $D_1$, and the distance $D_2$.

14. The computing device according to claim 12, wherein the tracking control system further comprises a second sound emitter and a third sound emitter, the second sound emitter and the third sound emitter are integrated on a same electronic screen as the second microphone array, and the determining the location of the first microphone array comprises:

obtaining an azimuth $\theta_3$ of the second sound emitter relative to the first microphone array and an azimuth $\theta_4$ of the third sound emitter relative to the first microphone array that are sent by the first microphone array; and determining an orientation of the first microphone array based on the azimuth $\theta_3$, the azimuth $\theta_4$, a location of the second sound emitter, and a location of the third sound emitter.

15. The computing device according to claim 12, wherein the camera is integrated with a fourth sound emitter, the second microphone array comprises a first microphone and a second microphone, and the determining the location of the camera comprises:

determining a distance $D_3$ between the first microphone and the fourth sound emitter and a distance $D_4$ between the second microphone and the fourth sound emitter based on a time at which the first microphone and the second microphone receive a sound signal from the fourth sound emitter and a time at which the fourth sound emitter emits the sound signal; and determining a location of the camera relative to the second microphone array based on a location of the first microphone, a location of the second microphone, the distance $D_3$, and the distance $D_4$.

16. The computing device according to claim 14, wherein the first microphone array is integrated with a first sound emitter, the camera is integrated with a fourth sound emitter and a third microphone array, and the determining the location of the camera comprises:

determining an azimuth $\theta_6$ of the first sound emitter relative to the third microphone array based on data detected by the third microphone array when the first sound emitter emits a sound signal, and determine an azimuth $\theta_7$ of the fourth sound emitter relative to the first microphone array based on data detected by the first microphone array when the fourth sound emitter emits a sound signal; and determining a deviation angle of the camera based on the azimuth $\theta_6$, the azimuth $\theta_7$, and the orientation of the first microphone array.

17. The computing device according to claim 14, wherein the first microphone array is integrated with a light emitter, the camera is integrated with a fourth sound emitter, and the determining the location of the camera comprises:

determining a location of a light emitting point in an image shot by the camera, wherein the image is shot when the light emitter emits light, and determine an azimuth $\theta_9$ of the light emitter relative to the camera based on the location of the light emitting point in the image and a rotation angle of the camera;

determining an azimuth $\theta_7$ of the fourth sound emitter relative to the first microphone array based on data detected by the first microphone array when the fourth sound emitter emits a sound signal; and determining an orientation of the camera based on the azimuth $\theta_9$, the azimuth $\theta_7$, and the orientation of the first microphone array.

18. A non-transitory computer-readable storage medium, wherein the computer-readable storage medium stores computer program code, and when the computer program code is executed by a computing device, the computing device performs operations applied to a tracking control system, the tracking control system comprises a first microphone array, a second microphone array, a camera, and a control device, and the operations comprise:

determining a location of the first microphone array and a location of the camera;

based on a sound source object making a sound, determining a location of the sound source object based on a location of the sound source object relative to the first microphone array, a location of the sound source object relative to the second microphone array, the location of the first microphone array, and a location of the second microphone array; and determining a tracking operation on the camera based on the location of the sound source object and the location of the camera.

19. The computer-readable storage medium according to claim 18, wherein the first microphone array is integrated with a first sound emitter, the second microphone array comprises a first microphone and a second microphone, and the determining the location of the first microphone array comprises:

determining a distance $D_1$ between the first sound emitter and the first microphone and a distance $D_2$ between the first sound emitter and the second microphone based on a time at which the first microphone and the second microphone receive a sound signal from the first sound emitter and a time at which the first sound emitter emits the sound signal; and determining a location of the first microphone array relative to the second microphone array based on a location of the first microphone, a location of the second microphone, the distance $D_1$, and the distance $D_2$.

20. The computer-readable storage medium according to claim 18, wherein the tracking control system further comprises a second sound emitter and a third sound emitter, the second sound emitter and the third sound emitter are integrated on a same electronic screen as the second microphone array, and the determining the location of the first microphone array comprises:

obtaining an azimuth $\theta_3$ of the second sound emitter relative to the first microphone array and an azimuth $\theta_4$ of the third sound emitter relative to the first microphone array that are sent by the first microphone array; and determining an orientation of the first microphone array based on the azimuth $\theta_3$, the azimuth $\theta_4$, a location of the second sound emitter, and a location of the third sound emitter.

* * * * *